US011379810B2

(12) United States Patent
Curtis

(10) Patent No.: US 11,379,810 B2
(45) Date of Patent: Jul. 5, 2022

(54) KIOSK GIFT CARD SYSTEM AND METHOD

(71) Applicant: James Curtis, Carrollton, TX (US)

(72) Inventor: James Curtis, Carrollton, TX (US)

( * ) Notice: Subject to any disclaimer, the term of this patent is extended or adjusted under 35 U.S.C. 154(b) by 207 days.

(21) Appl. No.: 16/792,735

(22) Filed: Feb. 17, 2020

(65) Prior Publication Data

US 2020/0226567 A1 Jul. 16, 2020

Related U.S. Application Data

(63) Continuation-in-part of application No. 16/667,088, filed on Oct. 29, 2019, now abandoned, which is a continuation-in-part of application No. 15/359,447, filed on Nov. 22, 2016, now Pat. No. 9,679,287, which is a continuation of application No. 14/697,318, filed on Apr. 27, 2015, now Pat. No. 9,508,064, which is a continuation of application No. 14/596,990, filed on Jan. 14, 2015, now Pat. No. 10,460,311, which is a continuation-in-part of application No. 13/108,837, filed on May 16, 2011, now abandoned, which is a continuation-in-part of application No. 12/839,294, filed on Jul. 19, 2010, now abandoned, which is a continuation-in-part of (Continued)

(51) Int. Cl.
*G06Q 20/18* (2012.01)
*G06Q 20/34* (2012.01)

(52) U.S. Cl.
CPC .......... *G06Q 20/18* (2013.01); *G06Q 20/348* (2013.01)

(58) Field of Classification Search
CPC ... G06Q 20/3433; G06Q 20/348; G06Q 20/18
USPC ........................................... 235/379; 703/16
See application file for complete search history.

(56) References Cited

U.S. PATENT DOCUMENTS 5,206,814 A 4/1993 Cahlander et al.
5,679,944 A 10/1997 Cusey et al.
(Continued)

FOREIGN PATENT DOCUMENTS

| CN | 101207785 | 6/2008 |
| JP | 2008140215 | 6/2008 |

(Continued)

OTHER PUBLICATIONS

"Object Storae: A Dell Point of View"; Dell Inc., Round Rock, Texas, USA, Dec. 9, 2010; 11 pp.
(Continued)

*Primary Examiner* — Allyson N Trail
(74) *Attorney, Agent, or Firm* — James H. Ortega; Carstens & Cahoon, LLP

(57) ABSTRACT

A gift card system and method for purchasing gift cards at a kiosk is disclosed. The system/method includes a gift card distribution kiosk located at a retail establishment that provides a user with access to a multitude of different forms of gift cards that may be purchased and printed onto a customizable card with a personalized message. The kiosk includes a kiosk processor interface, a gift card dispenser, a card reader and gift card management server connected to a network. The gift card management server, through the kiosk processor interface, provides vendor options to users to select and pay via the card reader. In another embodiment, the kiosk is used to redeem unused user gift cards for a reduced value user selected gift card, reduced cash value, full value store card, rewards points, bank debit, and/or electronic code user towards online purchases.

20 Claims, 16 Drawing Sheets

Related U.S. Application Data application No. 12/505,342, filed on Jul. 17, 2009, now abandoned.

(56) References Cited

U.S. PATENT DOCUMENTS

| | | |
|---|---|---|
| 5,892,900 A | 4/1999 | Ginter et al. |
| 6,092,054 A | 7/2000 | Tackbary et al. |
| 6,092,105 A | 7/2000 | Goldman |
| 6,193,155 B1 | 2/2001 | Walker et al. |
| 6,226,618 B1 | 5/2001 | Downs et al. |
| 6,532,201 B1 | 3/2003 | Hogan |
| 6,655,580 B1 | 12/2003 | Ergo et al. |
| 6,748,539 B1 | 6/2004 | Lotspiech |
| 7,108,171 B1 | 9/2006 | Ergo et al. |
| 7,225,982 B2 | 6/2007 | Morrison et al. |
| 7,478,143 B1 | 1/2009 | Friedman et al. |
| 7,494,048 B2 | 2/2009 | Gusler et al. |
| 7,536,324 B2 | 5/2009 | Perkowski |
| 8,089,655 B2 | 1/2012 | Elarde et al. |
| 8,162,383 B2 | 4/2012 | Curtis |
| 8,482,413 B2 | 7/2013 | Martin |
| 8,571,983 B1 | 10/2013 | Blackhurst et al. |
| 9,064,268 B2 | 6/2015 | Larrick et al. |
| 9,785,931 B2 | 10/2017 | Dwyre et al. |
| 9,972,044 B1 | 5/2018 | Russell |
| 10,319,173 B2 | 6/2019 | Adelberg et al. |
| 10,643,261 B2 | 5/2020 | Kressler |
| 10,919,173 B2 | 2/2021 | Bucks |
| 2001/0029583 A1 | 10/2001 | Palatov et al. |
| 2002/0095680 A1 | 7/2002 | Davidson |
| 2002/0103711 A1 | 8/2002 | Karas et al. |
| 2003/0135465 A1 | 7/2003 | Lee et al. |
| 2003/0177928 A1 | 9/2003 | Harris |
| 2004/0034785 A1 | 2/2004 | Tai et al. |
| 2004/0254940 A1 | 12/2004 | Brush |
| 2005/0018216 A1 | 1/2005 | Barsness et al. |
| 2005/0038714 A1 | 2/2005 | Bonet et al. |
| 2005/0049931 A1 | 3/2005 | Wisnudel et al. |
| 2005/0071045 A1 | 3/2005 | Clini |
| 2005/0076020 A1 | 4/2005 | Huntley et al. |
| 2005/0096936 A1 | 5/2005 | Lambers et al. |
| 2005/0102191 A1 | 5/2005 | Heller |
| 2005/0114205 A1 | 5/2005 | Nelson et al. |
| 2005/0149446 A1 | 7/2005 | Le Pannerer et al. |
| 2005/0172122 A1 | 8/2005 | Risan et al. |
| 2005/0227773 A1 | 10/2005 | Lu et al. |
| 2006/0011716 A1 | 1/2006 | Perkowski |
| 2006/0028398 A1 | 2/2006 | Willmore |
| 2006/0036549 A1 | 2/2006 | Wu |
| 2006/0074679 A1 | 4/2006 | Piter et al. |
| 2006/0235755 A1 | 10/2006 | Meueller |
| 2006/0235864 A1 | 10/2006 | Hotelling et al. |
| 2006/0259426 A1 | 11/2006 | Blama |
| 2007/0067340 A1 | 3/2007 | Lakamp et al. |
| 2007/0075134 A1 | 4/2007 | Perlow et al. |
| 2007/0181674 A1 | 8/2007 | Taylor et al. |
| 2007/0203788 A1 | 8/2007 | Andilib et al. |
| 2007/0214369 A1 | 9/2007 | Roberts et al. |
| 2007/0228162 A1 | 10/2007 | Phillips |
| 2007/0282747 A1 | 12/2007 | Shen et al. |
| 2008/0005025 A1 | 1/2008 | Legere et al. |
| 2008/0005802 A1 | 1/2008 | Feirstein et al. |
| 2008/0082688 A1 | 4/2008 | Yi et al. |
| 2008/0103974 A1 | 5/2008 | Fridhendler et al. |
| 2008/0116259 A1 | 5/2008 | Oberan |
| 2008/0189390 A1 | 8/2008 | Heller et al. |
| 2008/0201386 A1 | 8/2008 | Maharajh et al. |
| 2008/0235095 A1 | 9/2008 | Oles et al. |
| 2008/0255901 A1 | 10/2008 | Carroll et al. |
| 2009/0070122 A1 | 3/2009 | Hauck et al. |
| 2009/0117846 A1 | 5/2009 | Mavrakakis |
| 2009/0154899 A1 | 6/2009 | Barrett et al. |
| 2009/0193153 A1 | 7/2009 | Thanos |
| 2009/0204855 A1 | 8/2009 | Peters |
| 2009/0325602 A1 | 12/2009 | Higgins et al. |
| 2010/0057563 A1 | 3/2010 | Rauber et al. |
| 2010/0076010 A1 | 3/2010 | Buttars |
| 2010/0078474 A1 | 4/2010 | Rosenblatt et al. |
| 2010/0169652 A1 | 7/2010 | Butler |
| 2010/0198726 A1 | 8/2010 | Doran |
| 2010/0221938 A1 | 9/2010 | Liu |
| 2010/0250347 A1 | 9/2010 | Rainier et al. |
| 2011/0013501 A1 | 1/2011 | Curtis |
| 2011/0015934 A1 | 1/2011 | Rowe et al. |
| 2011/0093622 A1 | 4/2011 | Hahn et al. |
| 2011/0099104 A1 | 4/2011 | Nybom |
| 2011/0161409 A1 | 6/2011 | Nair et al. |
| 2011/0314153 A1 | 12/2011 | Bathiche et al. |
| 2012/0004770 A1 | 1/2012 | Ooyen et al. |
| 2012/0011540 A1 | 1/2012 | Pullford |
| 2012/0109787 A1 | 5/2012 | Larrick et al. |
| 2012/0150343 A1 | 6/2012 | Baric |
| 2013/0191170 A1 | 11/2013 | Jarrett et al. |
| 2013/0297431 A1 | 11/2013 | Deubell et al. |
| 2013/0329741 A1 | 11/2013 | Deubell et al. |
| 2014/0229383 A1 | 8/2014 | Wolfe |
| 2015/0278801 A1 | 10/2015 | Friedlander |
| 2015/0294318 A1 | 10/2015 | Hui et al. |

FOREIGN PATENT DOCUMENTS

| | | |
|---|---|---|
| WO | 2000070517 | 11/2000 |
| WO | 2002032047 A1 | 4/2002 |
| WO | 2012100239 | 7/2012 |

OTHER PUBLICATIONS

"7VCAS Verimatrix Content Security Manager"; Verimatrix, Inc.; San Diego, Ca, USA; Aug. 29, 2010; 2 pp.

VCAS Verimatrix ViewRight STB for IPTV; Verimatrix, Inc.; San Diego, Ca, USA; Aug. 29, 2010; 2 pp.

"Kaleidescape Conductor", www.kaleidescape.com.

Panasonic Ideas for Life, http://www2.panasonic.com/consumer-electronics/shop/Video/Blu-ray-Disc-Players/model . . . , 2 pp.

Brad Stone, "Software That Copies DVDs is on Trial", http://www.nytimes.com/2009-04-24technology/2 . . . html?_r=2&partner=rss&emc=rss&pagewanted-print, 3 pp.

"Kaleidescape 1080p Player, KPLAYER-6000", 2 pp.

Chris Albrecht, "MOD Systems Sees Video delivery Via SD Cards", Jan. 8, 2009, 3 pp.

"MOD Systems Corporate Backgrounder", Jan. 2009, 3 pp.

0100

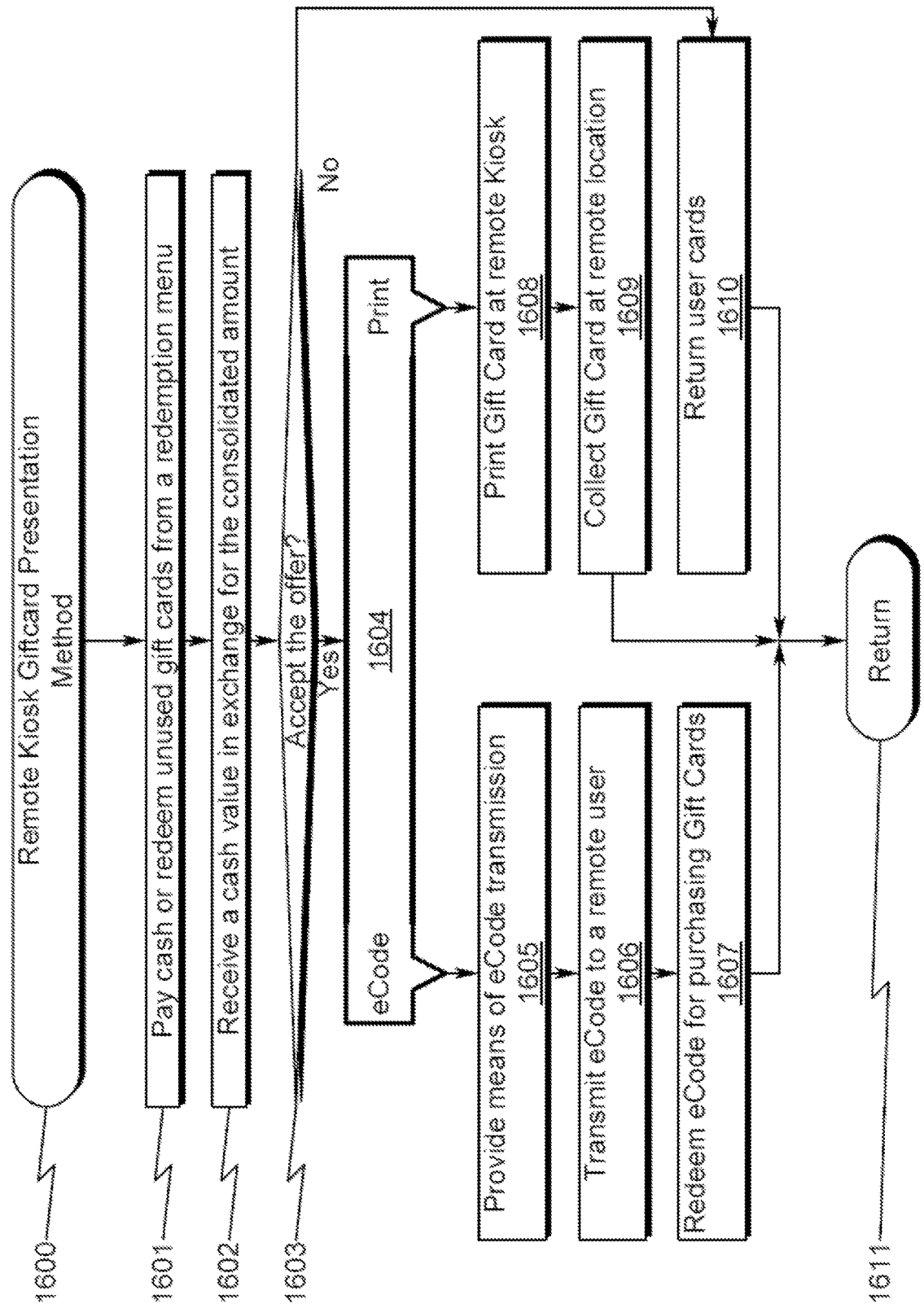

KIOSK GIFT CARD SYSTEM AND METHOD

CROSS-REFERENCE TO RELATED APPLICATIONS

This disclosure is a continuation-in-part of U.S. application Ser. No. 16/667,088, filed on Oct. 29, 2019, which is a continuation of U.S. application Ser. No. 15/359,447, filed on Nov. 22, 2016, now U.S. Pat. No. 9,679,287, which is a continuation of U.S. application Ser. No. 14/697,318, filed on Apr. 27, 2015, now U.S. Pat. No. 9,508,064, which is a continuation of U.S. application Ser. No. 14/596,990, filed Jan. 14, 2015, now U.S. Pat. No. 10,460,311, which is a continuation-in-part of U.S. application Ser. No. 13/108,837, filed May 16, 2011, now abandoned, which is a continuation-in-part of U.S. application Ser. No. 12/839,294, filed Jul. 19, 2010, now abandoned, which is a continuation-in-part of U.S. application Ser. No. 12/505,342, filed Jul. 17, 2009, now abandoned.

TECHNICAL FIELD OF THE INVENTION

The present invention relates generally to gift cards and more particularly to purchasing vendor specific gift cards and exchanging unused gift cards at a kiosk.

PRIOR ART AND BACKGROUND OF THE INVENTION

Prior Art Background

Gift cards can be perceived as a quintessential cop-out gift, pegging the gift-giver as lazy or impersonal. While that may be true of the preloaded value cards that big chain stores put out and that can be found in virtually every drugstore now, small businesses have the advantage of developing gift card offerings that are good for more than just cash on a card. However, current gift card offerings do not provide a convenient method to purchase the gift card except to physically visit the store.

A fixed-money amount for a gift card limits the gift giver in what they are able to spend. Typically people have long holiday gifts lists and a budget for how much they want to spend on each person, but they will be more likely to spend $150 if they know, for example, that they are buying someone a deluxe spa package. However, most gift cards available in stores have a logo or print with the face value of the card. Therefore, there is a need for a customizable gift card available to customers at a convenient location.

Often times, the people who are buying gift cards are not the regular customers. So if they don't know anything about the business, then they are not going to know how much to spend. Providing customers with the opportunity to purchase different types of packages helps them feel like they are providing a more personalized gift. Therefore, there is a need for providing customizable and personalized gift card options to consumers.

Convenience plays a big role in the purchasing of gift cards during the holidays. While not everyone buys their gifts online, most people will at some point be browsing the web for gift ideas during these final weeks, and the more they come across your website while shopping, the better. Anyone can easily go to the big box stores for the standard gift offerings, but most people would rather give a gift that is local to the recipient and shows that they put some thought into the purchase.

Customers enjoy the sheer convenience of sending the certificate in an email with a personalized message, or if they are seeing the person they can print out the certificate and hand it to them. Either way, there is an element of personalization to it because you can write your own message and choose the background for the certificate. Therefore, there is a need for a personalizing gift cards at a local convenience or retail store kiosk.

Some recipients of gift cards do not necessarily use the cards due to several reasons. Currently, there are no systems to redeem unused gift cards for cash, reduced value gift cards, rewards points, automatic bank debit, or an eCode for applying to online purchases.

Deficiencies in the Prior Art

The prior art as detailed above suffers from the following deficiencies:
  Prior art systems do not provide for a convenient method to purchase the gift card except to physically visit the store.
  Prior art systems do not provide for customizable gift cards available to customers at a convenient location.
  Prior art systems do not provide for providing personalized gift card options to consumers.
  Prior art systems do not provide for exchanging unused gift cards for a reduced cash offer.
  Prior art systems do not provide for exchanging unused gift cards for a reduced value gift card offer for a preferred gift card of choice.
  Prior art systems do not provide for redeeming unused gift cards for a full value store credit.
  Prior art systems do not provide for redeeming unused gift cards for rewards points.
  Prior art systems do not provide for redeeming unused gift cards for a promotional code that could be used for online purchases.
  Prior art systems do not provide for redeeming unused gift cards for a promotional code that could be used at a different location for printing customizable gift cards.

While some of the prior art may teach some solutions to several of these problems, the core issue of purchasing gift cards at a kiosk has not been addressed by prior art.

OBJECTIVES OF THE INVENTION

Accordingly, the objectives of the present invention are (among others) to circumvent the deficiencies in the prior art and affect the following objectives:
  Provide for a convenient method to purchase the gift card expect to physically visit the store.
  Provide for customizable gift cards available to customers at a convenient location.
  Provide for providing personalized gift card options to consumers.
  Provide for exchanging unused gift cards for a reduced cash offer.
  Provide for exchanging unused gift cards for a reduced value gift card offer for a preferred gift card of choice.
  Provide for redeeming unused gift cards for a full value store credit.
  Provide for redeeming unused gift cards for rewards points.
  Provide for redeeming unused gift cards for a promotional code (e.g., an eCode) that could be used for online purchases.

Provide for redeeming unused gift cards for a promotional code that could be used at a different location for printing customizable gift cards.

Provide limited use gift cards that may have restrictions on their use for purchasing certain items or making purchases at certain merchants or within certain geographic locations.

Provide for the recording of personalized audio and/or visual messages from a purchaser to a receiver of a gift card to be played back when the receiver obtains the gift card or promotional code.

Provide for creation and presenting of a greeting card, with or without a gift card by a purchase and provided to a receiver of the gift card.

Provide for the creation of a limited number of "collector edition" gift cards, such as gift cards related to movies, TV shows, and musical artists.

Provide for purchasing encoded tickets for events via a disclosed kiosk, such as for concerts, plays, and sporting events.

Provide for purchasing gifts in the form of gift cards or eCodes for downloading or streaming video games or music, whether specific tracks or entire albums.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

System Overview

The present invention in various embodiments addresses one or more of the above objectives in the following manner. The present invention provides a kiosk gift card system for purchasing gift cards at a kiosk. The system includes a gift card distribution kiosk located at a retail establishment that provides a user with access to a multitude of different forms of gift cards that may be purchased and printed onto a customizable card with a personalized message. The kiosk includes a kiosk processor interface, a gift card dispenser, a card reader, and gift card management server connected to a network. The gift card management server, through the kiosk processor interface, provides vendor options to users to select and pay via the card reader. In another embodiment, the kiosk is used to redeem unused user gift cards for a reduced value user selected gift card, reduced cash value, full value store card, rewards points, bank debit, and/or electronic code user towards online purchases.

Method Overview

The present invention system may be utilized in the context of an overall kiosk gift card purchase method, wherein the kiosk gift card system as described previously is controlled by a method having the following steps:
(1) clicking on the kiosk processor interface;
(2) browsing through a list of vendors;
(3) selecting a vendor to purchase a gift card from the vendor;
(4) requesting a monetary amount to apply to the gift card;
(5) paying the monetary amount;
(6) printing and dispensing the gift card; and
(7) collecting the gift card.

Integration of this and other preferred exemplary embodiment methods in conjunction with a variety of preferred exemplary embodiment systems described herein in anticipation by the overall scope of the present invention.

BRIEF DESCRIPTION OF THE DRAWINGS

For a fuller understanding of the advantages provided by the invention, reference should be made to the following detailed description together with the accompanying drawings wherein:

FIG. 16 illustrates a flowchart describing a remote kiosk gift card presentation method according to a preferred exemplary embodiment of the present invention.

DESCRIPTION OF THE PRESENTLY PREFERRED EXEMPLARY EMBODIMENTS

Figure 1:
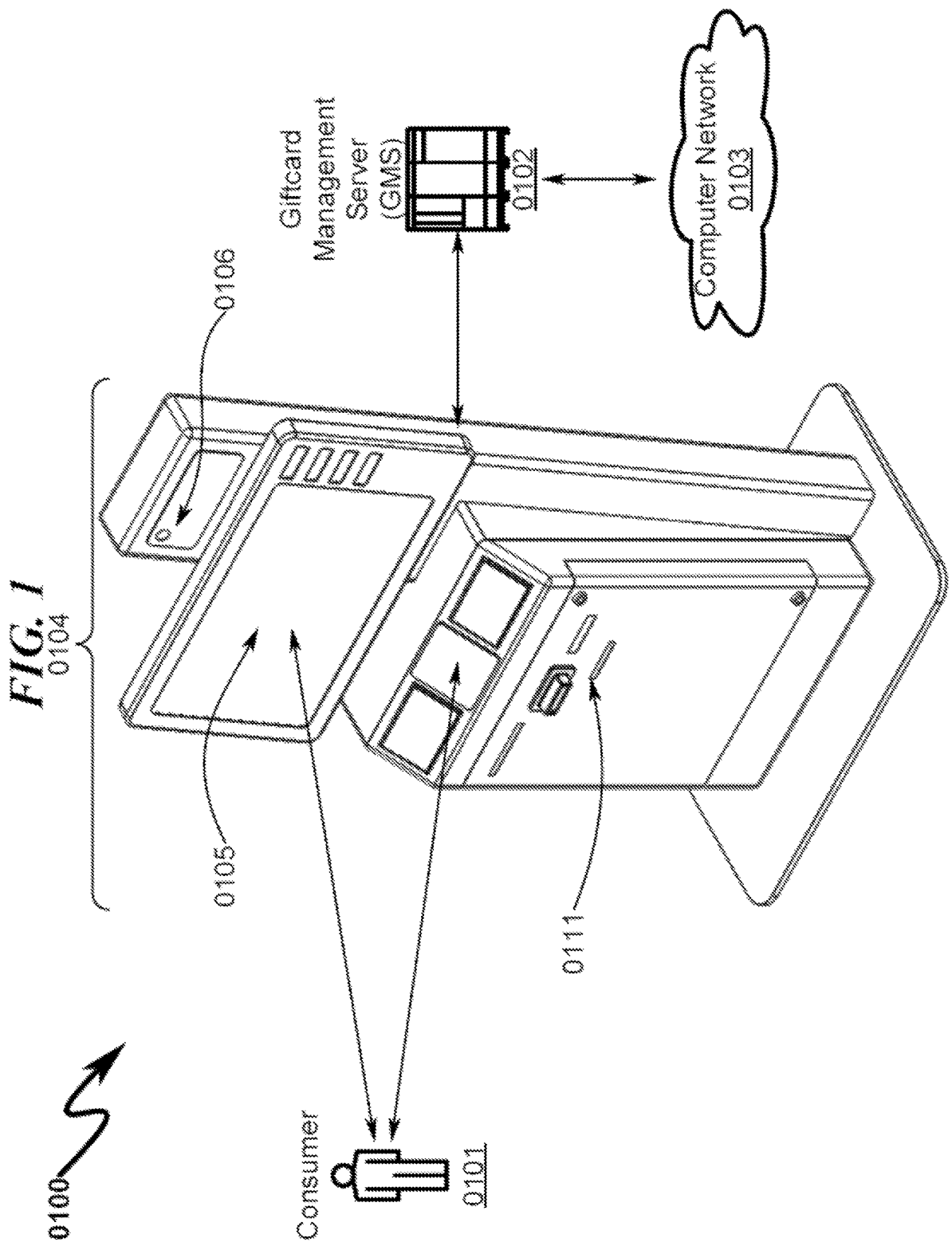
FIG. 1 illustrates an overall kiosk gift card system according to a preferred embodiment of the present invention.

While this invention is susceptible of embodiment in many different forms, there is shown in the drawings and will herein be described in detailed preferred embodiments of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a gift card system and method. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Preferred Exemplary Kiosk Gift Card System (0100)

The present invention may be seen in more detail as generally illustrated in FIG. 1 (0100), wherein a kiosk gift card system comprises a kiosk (0104) with a gift card dispenser (0111), a live interface portal (LIP) (0106), a kiosk processor interface (0105) that communicates with a gift card management server (0102). The kiosk processor interface (0105) may be a touch user interface that is based upon the sense of touch or a graphical user interface (GUI) that may be navigated with a pointing device such as a mouse. A user (0101) may use the touch interface to interact and navigate the kiosk (0104).

According to a preferred exemplary embodiment, a user may purchase a gift card at kiosk with the kiosk processor interface. The gift card may be customized to add a fixed value and also personalized to add a personal message or image on the card. A user may request a gift card for a specific vendor, for example Starbucks, and add a fixed amount, for example $90. In other embodiments, the gift card may be configured with a variable amount, and can thus be reloaded, as needed, with any particular amount. In addition, the vendor may not necessarily by limited to a particular merchant/retailer, but is instead one that provides gift cards that may be used at multiple retail locations, such as a VISA® or MasterCard® gift card.

Furthermore, the user may include a personalized message such as "Happy Holidays" or any other customized private message, as discussed herein, on the card. Additionally, the user may personalize the font, design, color, size, and position of the personalized message. In some embodiments, the personalized message may be audio and/or video messages recorded by the purchaser at the kiosk used to purchase the gift card. Such embodiments would allow a purchaser to record an audio/video message that would then accompany the gift card (or gift card eCode, etc.) such that when the receiver of the gift card obtains it, they would see/hear the personalized message recorded by the purchaser. Such playback could be played from the kiosk at, and during the time, which the receiver obtains the gift card, providing for a very personalized and special experience while receiving a gift card. Similarly, when the gift card is provided as an eCode or other form of payment vehicle, the personalized recorded message could accompany the receipt of the eCode, etc., either at the kiosk visited by the receiver or even via the message by which the receiver receives the eCode or other form of payment vehicle, such as an email or a mobile message (away from a kiosk), an NFC transfer to the receiver's device or any other means by which the receiver receives the gift card code, etc. either physically or via a device of the receiver.

The kiosk processor interface (KPI) (0105) receives a purchase request from the user (0101) and forwards the request to a gift card management server (GMS) (0102). The GMS (0102) may then connect with the vendor of interest and receive a confirmation to print or reload the gift card. The GMS (0102) may then instruct a printer to print the gift card and dispense the gift card via the gift card dispenser (0111) after an amount has been paid with a card reader and a payment module. After a transaction is complete, the user may request real time support through a live interface portal (0106) such as a camera or an online chat on the KPI (0105). The user may also seek live support during the gift card transaction with the live interface portal (0106). The LIP (0106) may further communicate with a customer support center through (0103) a network and gift card management server (0102).

Preferred Exemplary Kiosk Gift Card System (0200)

Figure 2:
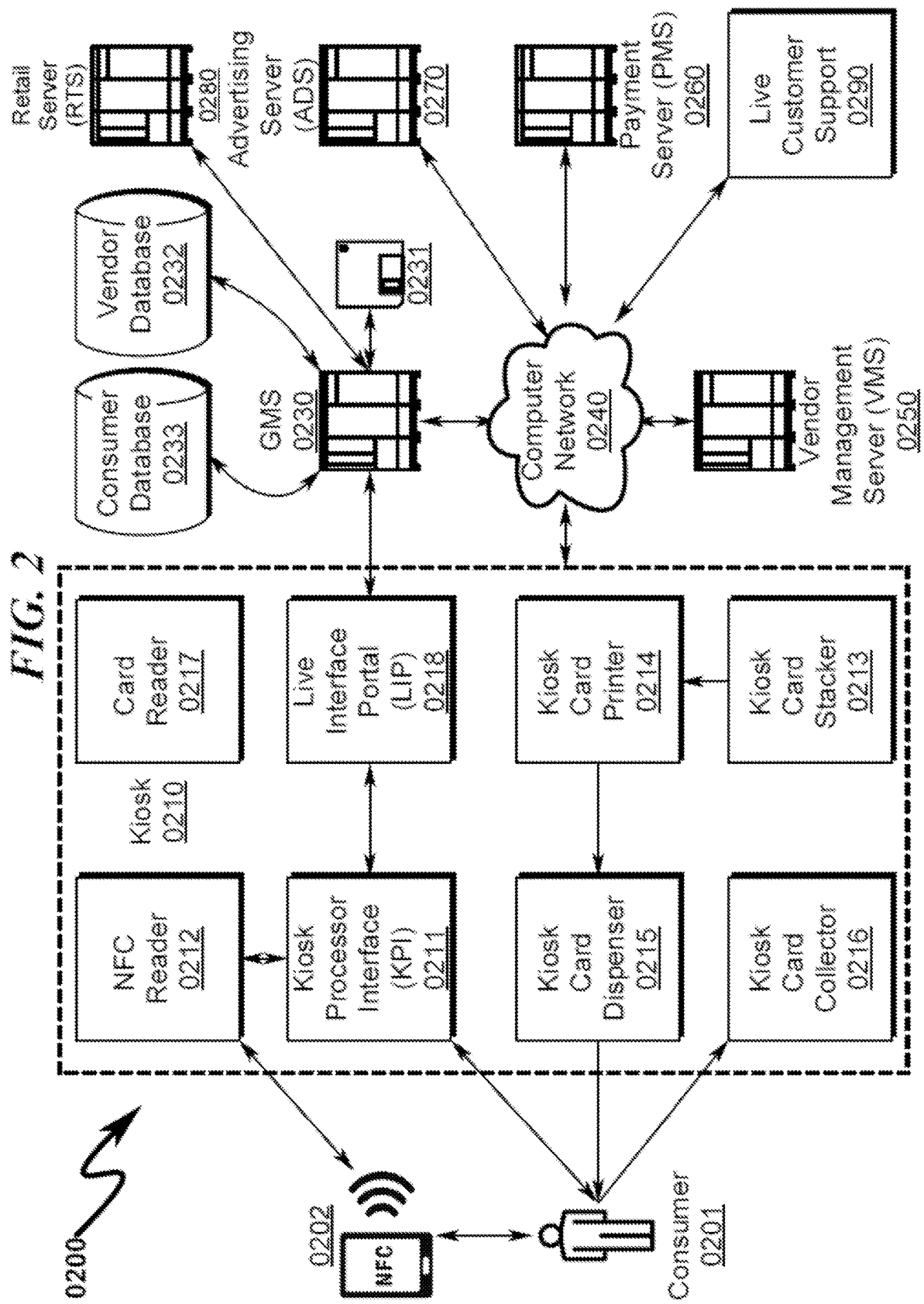
FIG. 2 illustrates a detailed kiosk gift card system according to a preferred embodiment of the present invention.

The present invention may be seen in more detail as generally illustrated in FIG. 2 (0200), wherein a user/consumer (0201) interacts with a kiosk gift card system located in a retail establishment. For example the kiosk may be located in retail establishments such as Walmart, Home Depot, in a Mall, in a public event place such a sports stadium, in an office building etc. In some embodiments, the location of the kiosk may also impact the gift card amounts. More specifically, users may be offered additional "bonus" amounts on a gift card if the vendor they select is the vendor at which the kiosk is located. In embodiments where a second kiosk at a different location is used to print the gift card, which are discussed in further detail below, the "bonus" funds may be provided if the vendor at the location of the second kiosk is selected by the user/purchaser at the first kiosk. Such embodiments provide an incentive for the receiver of the gift card at the second location to patronize the retailer at that second location.

The system comprises a kiosk (0210) with a kiosk processor interface (KPI) (0211) that communicates with a gift card management server (0230). The GMS (0230) may be physically connected directly to the kiosk (0210). The GMS (0230) may be remotely located that may be accessible via the network (0240). An administrator may remotely monitor GMS (0230) via the network (0240). The network may be wired and may use protocols such as Ethernet. The network may be wireless and may use protocols such as 4G, LTE, and/or Bluetooth.

The KPI (0211) is configured for enabling users to interact with GMS (0230). The GMS (0230) may further comprise a microprocessor executing instructions read from a computer-readable medium (0231) and a graphical user interface (GUI) with a pointing device. An administrator may open a GUI and select vendor database (0232) for updating records. A more detailed view of GUI may be seen in FIG. 4 (0400).

The kiosk further comprises a Kiosk Card Stacker (0213) that maintains an inventory of blank cards equipped with or without a NFC device. The NFC device in a card may be enabled to communicate wirelessly with a NFC reader installed in a mobile computing device such as a smart phone or other NFC reader equipped devices. The blank cards may be configured to be in different sizes so as to enable users to choose a size. A Kiosk card printer (0214) may be connected physically to the Kiosk Card Stacker (0213). The Kiosk Card Stacker (0213) may automatically feed a blank card to the printer when it receives a print request. The print request may include information pertaining to the card size, personalized message, color, logo, value, and/or NFC chip.

The kiosk processor interface (KPI) (0211) may receive a purchase/exchange request from a user (0201) which subsequently forwards the request to a gift card management server (GMS) (0230). The GMS (230) may then search the vendor database (0232) to check if the vendor exists on the database. If so, the GMS (0230) may connect with the vendor of interest via vendor management server (VMS) (0250) via network (0240) and receive a confirmation to print the gift card. The user may pay with a credit card or debit card for the requested amount with a card reader (0217). The user may also choose to pay in cash. The card reader may communicate via network (0240) with a payment server (0260) that authenticates the payment and sends a confirmation for the payment. The GMS (0230) may then instruct a printer (0214) to print the gift card and dispense the gift card via the gift card dispenser (0215). According to an exemplary embodiment, gift card manufacturing on demand (MOD) with a gift card kiosk enables a consumer to print a gift card on as needed basis.

The kiosk may also comprise a Near Field Communication (NFC) device (0212). The communication (NFC) is a standards-based short-range wireless connectivity technology that makes life easier and more convenient for consumers by making it simpler to make transactions, exchange digital content, and connect electronic devices with a touch. The user may use a mobile computing device (0202) equipped with a NFC reader to establish a NFC connection with the kiosk (0210). According to a preferred exemplary embodiment, the user (0201) may use the NFC device (0202) to pay for a gift card. The user may also receive a confirmation to the device (0202).

The kiosk (0210) may also be communicating via network (0240) with an advertisement server ADS (0270) that is configured to display advertisements on the kiosk processor interface (0211). According to a preferred exemplary embodiment, the kiosk is enabled to target advertisements to the user through the advertising server (0270), and such advertisements may even be demographically based.

The kiosk (0210) may also use a card collector (0216) to gather unused gift cards that may be redeemed or exchanged for like kind gift cards or cash as described below in one of several methods. The unused cards may be recycled or reused for customized gift cards.

According to preferred exemplary embodiment, the kiosk in the retail establishment may be integrated into the retail network server (0280) to provide retailer specific value offers and discounts. For example, if the kiosk is located in Walmart, advertisements and offers related to Walmart may be displayed on the KPI (0211). Value Offers may also be presented to the user on a mobile computing device (MCD) (0202). The consumer may use the Value offers at check out with the MCD (0202) or print a paper copy at the kiosk.

Vendor Database (0232)

As illustrated below in Table 1.0, the vendor database (VDB) (0232) may further comprise vendor related information such as "Vendor Name", "Vendor ID", "Credit Limit", "Address" and "Gift Card Serial Number". The VDB (0232) may communicate with GMS (0230) or through a wired or wireless network. When a consumer requests a gift card, the KPI (0211) may process and forward the request to the GMS (0230). The GMS (0230) may determine the vendor from request and issue a gift card with a serial number from the VDB (0232). If the requested gift card amount exceeds the Credit Limit for the vendor, the GMS (0230) may forward the request to a vendor management server (0250). The VMS (0250) may further communicate with the user requested vendor with the Address, for authorization upon which a customized gift card may be printed and dispensed to the requesting consumer.

TABLE 1.0

| Vendor Name | Vendor ID | Credit Limit | Address | Gift Card Serial No. |
|---|---|---|---|---|
| Vendor 1 | 58769 | $1,000 | www.vendor1.com | 5687587-576768 |
| Vendor 2 | 69789 | $ 500 | www.vendor2.com | 6687587-676769 |
| Vendor 3 | 96987 | $ 100 | www.vendor3.com | 7687587-776770 |
| Vendor 4 | 56876 | $ 500 | www.vendor4.com | 8687587-876771 |
| Vendor 5 | 64647 | $1,000 | www.vendor5.com | 9687587-976772 |

Consumer Database (0233)

As illustrated below in Table 2.0, the consumer database (CBD) (0233) may further comprise consumer related information such as "Consumer Name", "Consumer ID", "Credit Check", "Consumer Contact information", and "Consumer History". A single entry for example may contain information about a consumer 1 with a consumer ID 123-56-789 who has been credit checked. The CDB (0233) may also maintain consumer history and past purchases. For example, Consumer 1 may have purchased a Vendor 1 and Vendor 3 gift card. The consumer history, as well as demographics based on any collected consumer demographic information, may be analyzed further for presenting specific advertisements to consumers with an advertising server ADS (0270). It should be appreciated by anyone skilled in the art that the database may be maintained and stored in standard SQL or any industry DBMS standard.

TABLE 2.0

| Consumer Name | Customer ID | Credit Check | Customer Contact | History |
|---|---|---|---|---|
| Consumer 1 | 123-56-789 | Yes | 123-334-3456 | Vendor 1, Vendor 3 |
| Consumer 2 | 123-56-790 | Yes | 123-354-3457 | Vendor 3, Vendor 4 |
| Consumer 3 | 123-56-791 | No | 123-364-3458 | Vendor 2, Vendor 5 |
| Consumer 4 | 123-56-792 | Yes | 123-374-3459 | Vendor 4, Vendor 6 |
| Customer 5 | 123-56-793 | No | 123-384-3460 | Vendor 6, Vendor 7 |

Consumer Personalization

According to a preferred exemplary embodiment, consumer personalization may be used to provide specific customer history with real time evaluation and supported purchases. For example, from the aforementioned table 2.0, consumer 2 may be evaluated in real time based on past purchase history such as Vendor 3 and Vendor 4. The consumer 3 may be presented with an advertisement for Vendor 3 or Vendor 4 after identifying the consumer with the CDB (0233) and consumer ID.

Consumer History Macro (Total) & Micro (by Card)

According to a preferred exemplary embodiment, the CDB (0233) may also provide Macro reports for total customer specific history in a particular category. For example, a consumer's past history from the CDB (0233) may indicate purchases in a drug store and the specific information may be used to present drug store related advertisements or drug store related gift cards.

Similarly, the CDB (0233) may also provide Micro reports for specific customer history with a genre or historical favorites. For example, a consumer's past history or historical favorites may be analyzed and determined that a consumer is interested in sports. A history of all transactions on a particular card may also be analyzed and Consumer Card Balances According to a preferred exemplary embodiment, a consumer may use the KPI (0211) and obtain real time balance on a gift card directly or with a NFC device (0202). A consumer (0201) may insert a gift card into card reader (0217) in the kiosk (0200). The card reader (0202) may then determine the vendor ID based on the gift card information. The GMS (0230) may then query the vendor database (0232) with the Vendor ID and receive a vendor address which may be used to login into a vendor management server (VMS) (0250). The VMS (0250) may then respond to the GMS (0230) with a gift card balance that may be presented to the consumer (0201) on the interface (0211). The gift card balance may also be wirelessly transmitted to the consumer's mobile device (0202) with the NFC reader (0212).

Consumer Direct Marketing

According to a preferred exemplary embodiment, the retailer system/kiosk interface provides customer specific advertising micro marketing material with the Advertising server (ADS) (0270). For example, when a consumer interfaces with the KPI (0211), the consumer may be identified with a consumer ID and the CDB (0233). The GMS (0230) may use the consumer information and forward it to an advertisement server ADS (0270) that is configured to serve advertisements. The ADS (0270) may serve advertisements directly to the consumer based on the consumers past purchase history, as well as collected or determined consumer demographics, while the customer is waiting for a transaction. Proximity marketing applications may be employed to target user mobile phones using beaconing connectivity technology as part of the hardware component matrix. In such embodiments, users may have a mobile application affiliated with the kiosk, or even with retailers/merchants available through the kiosk, for provide such targeted advertisements. Additionally, push advertisements may be transmitted directly to the consumer for promotions, coupons and product information. Retailer/merchant- and application-friendly integration may be provided at disclosed kiosks. Similarly, micro marketed promotions and discounts based on historical purchases or viewing may also be provided to a consumer.

Consumer Fraud Alerts

According to a preferred exemplary embodiment, the system/kiosk may provide "push" communication in the event of any issues with account usage or unauthorized access. When a user interfaces with KPI (0211), the consumer may be identified and if there is a history of misusage in the consumer's history, an alert may be communicated to the retail establishment. The alert may be transmitted with the network (0240) or an alarm may be sounded to notify concerned officials.

Consumer Customer Services

According to a preferred exemplary embodiment, the kiosk may provide connectivity with a "live" communication for post purchase, post issue follow up with a live interface portal (LIP) (0218). The LIP (0218) may be an audio device such as a microphone or a video device such as a camera. The LIP (0218) may enable a consumer (0201) to communicate with a live customer support (0290) via GMS (0230) and network (0240). Alternately, a consumer may perform an online chat on the KPI (0211) with a touch screen or typing with a keyboard. The consumer may also request support before a transaction, during a transaction, or after a transaction.

Preferred Exemplary Kiosk Processor Interface
(0300-0400)

Figure 3:
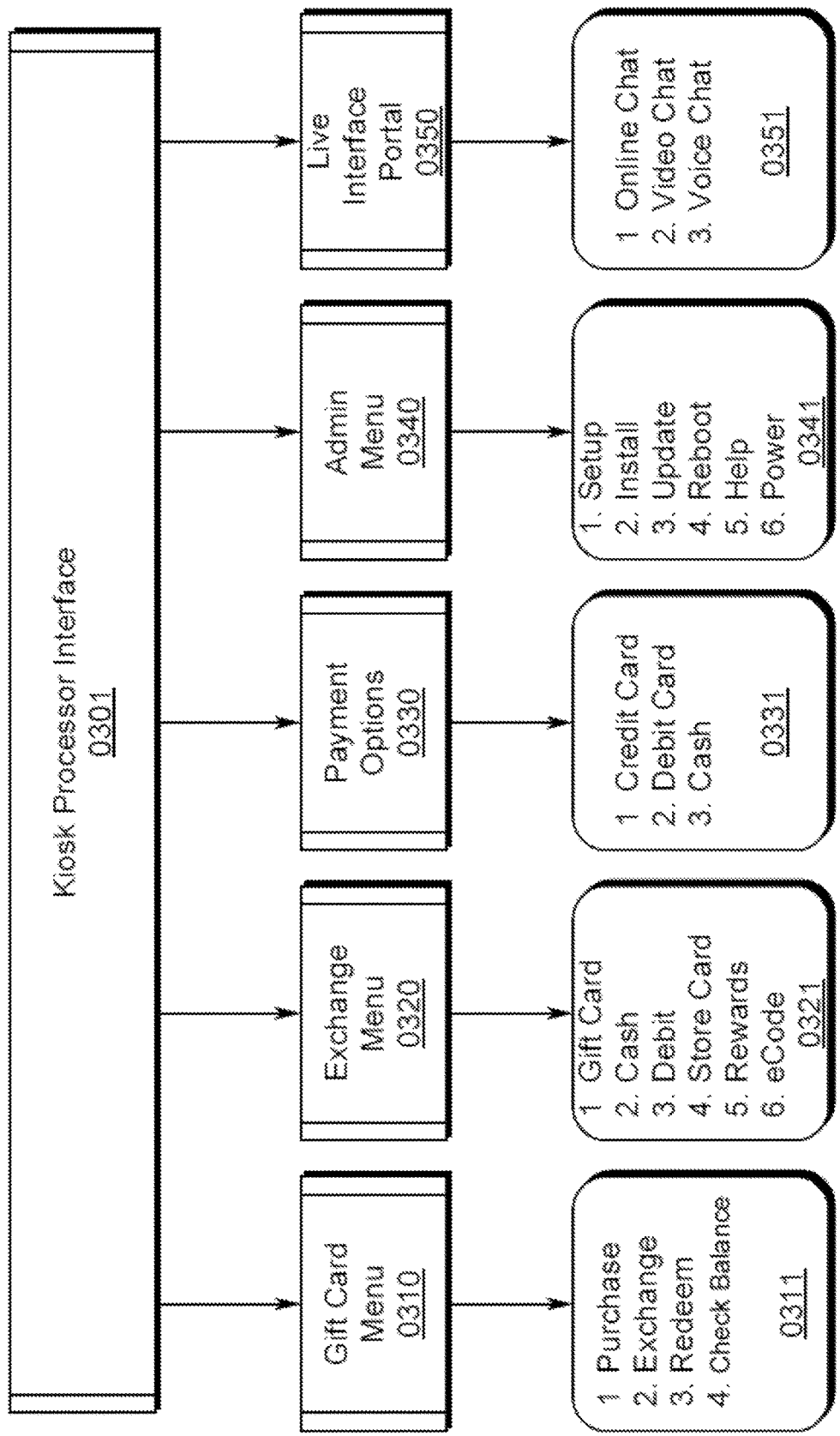
FIG. 3 illustrates a detailed kiosk processor interface system according to a preferred embodiment of the present invention.
Figure 4:
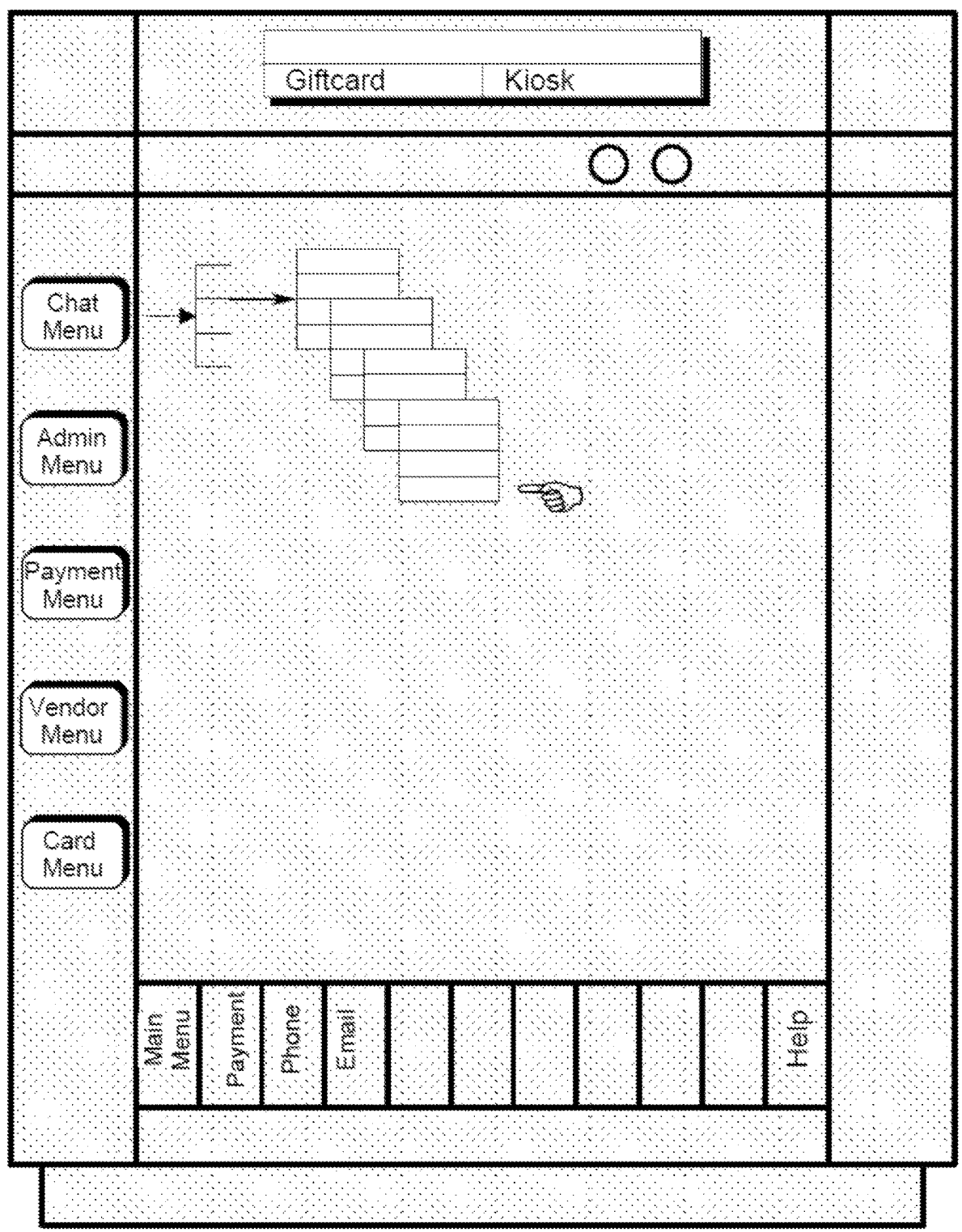
FIG. 4 illustrates a detailed kiosk processor interface display according to a preferred embodiment of the present invention.

As generally illustrated in FIG. 3 (0300) and FIG. 4 (0400), an exemplary kiosk processor interface (0301) comprises a gift card menu (0310) for purchasing/exchanging, a gift card exchange/redeeming menu (0320), a payment option menu (0330), an administrator menu (0340), and a chat menu (0350). A user may interface with a kiosk via the KPI (0301) and navigate through the menus with a touch interface or a graphical interface. The user may select an exchange menu (0320) to exchange unused gift cards that may or may not have a balance on them. The user may exchange for another gift card from a different vendor, cash, bank debit, store credit, and/or an eCode for use with online purchases (0321). As discussed throughout this disclosure, when the term gift card is used, it is understood that the gift card may be administered via more than simply a physical payment card. In some embodiments, the gift card may be administered via such an eCode, either entered manually or provided via another payment vehicle such as a mobile phone payment application. An administrator may login to the KPI (0301) via the admin menu (0340) and perform administrator actions such as set up, update, reboot, and/or install new features (0341). The user may be provided with payment options such as credit card, debit card, and/or cash (0331). The user may select a gift card menu (0310) to access options such as gift card purchase, gift card reload, gift card exchange, gift card redeem or gift card balance check (0311). The user may also request support from customer support (0290) through a live interface portal. The user may choose one of the chat options (0351) from online chat, video chat and voice chat.

Preferred Exemplary Flowchart Kiosk Gift Card
Purchase Method (0500)

Figure 5:
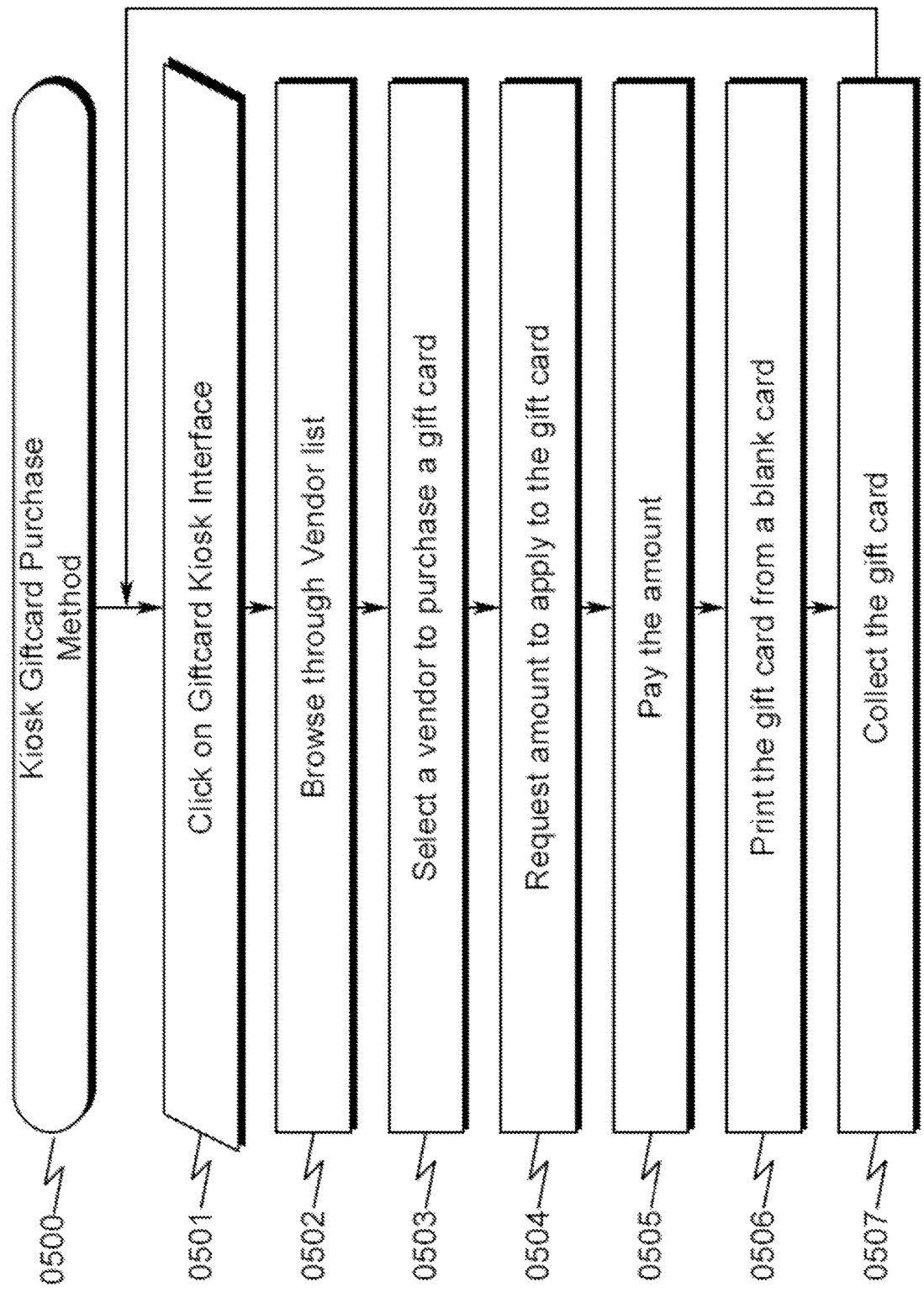
FIG. 5 illustrates a flowchart describing an exemplary kiosk gift card purchase according to a preferred embodiment of the present invention.

As generally seen in the flow chart of FIG. 5 (0500), a preferred exemplary Kiosk Gift Card Purchase method may be generally described in terms of the following steps:
(1) clicking on the kiosk processor interface (0501);
   A user may click through or touch the KPI to navigate the different options of the interface as aforementioned in FIG. 3 (0300) and FIG. 4 (0400).
(2) browsing through a list of vendors (0502);
   The user may browse through a list of vendors that are stored and maintained in a vendor database that is accessible by a gift card management server via a network. An administrator may add/delete/update vendors in the vendor database. In addition, the user may insert, or scan with a card reader, a prior-purchased used gift card for reloading with funds. In such case, after inserting the gift card into the kiosk, the kiosk's processor can simply identify the vendor of the gift card from among the available list of vendors available through the kiosk.
(3) selecting a vendor to purchase a gift card from the vendor (0503);
   The user may select a vendor from the list of vendors. In embodiments with a previously purchased gift card, the user may simply confirm the vendor identified by the kiosk. Alternatively, if the kiosk is not able to identify the vendor of an inserted previously purchased gift card, the user may then be given the option to select the appropriate vendor the user would like to use for the prior gift card.

(4) requesting a monetary amount to apply to the gift card (0504);

The user may request an amount to be applied to the gift card. The request may then be forwarded to GMS for processing. The GMS may connect with the vendor of interest to vendor management server (VMS) via network and receive a confirmation to print the gift card.

(5) paying the monetary amount (0505);

The user may pay with a credit card or debit card for the requested amount with a card reader. The user may also choose to pay in cash. The card reader may communicate via network with a payment server that authenticates the payment and sends a confirmation for the payment.

(6) printing and dispensing the gift card (0506); and

The GMS may then instruct a gift card printer to print the gift card with a personalized message and dispense the gift card via a gift card dispenser.

(7) collecting the gift card (0507).

The user may then collect the gift card from the gift card dispenser.

Preferred Exemplary Flowchart Kiosk Gift Card Exchange Method (0600)

Figure 6:
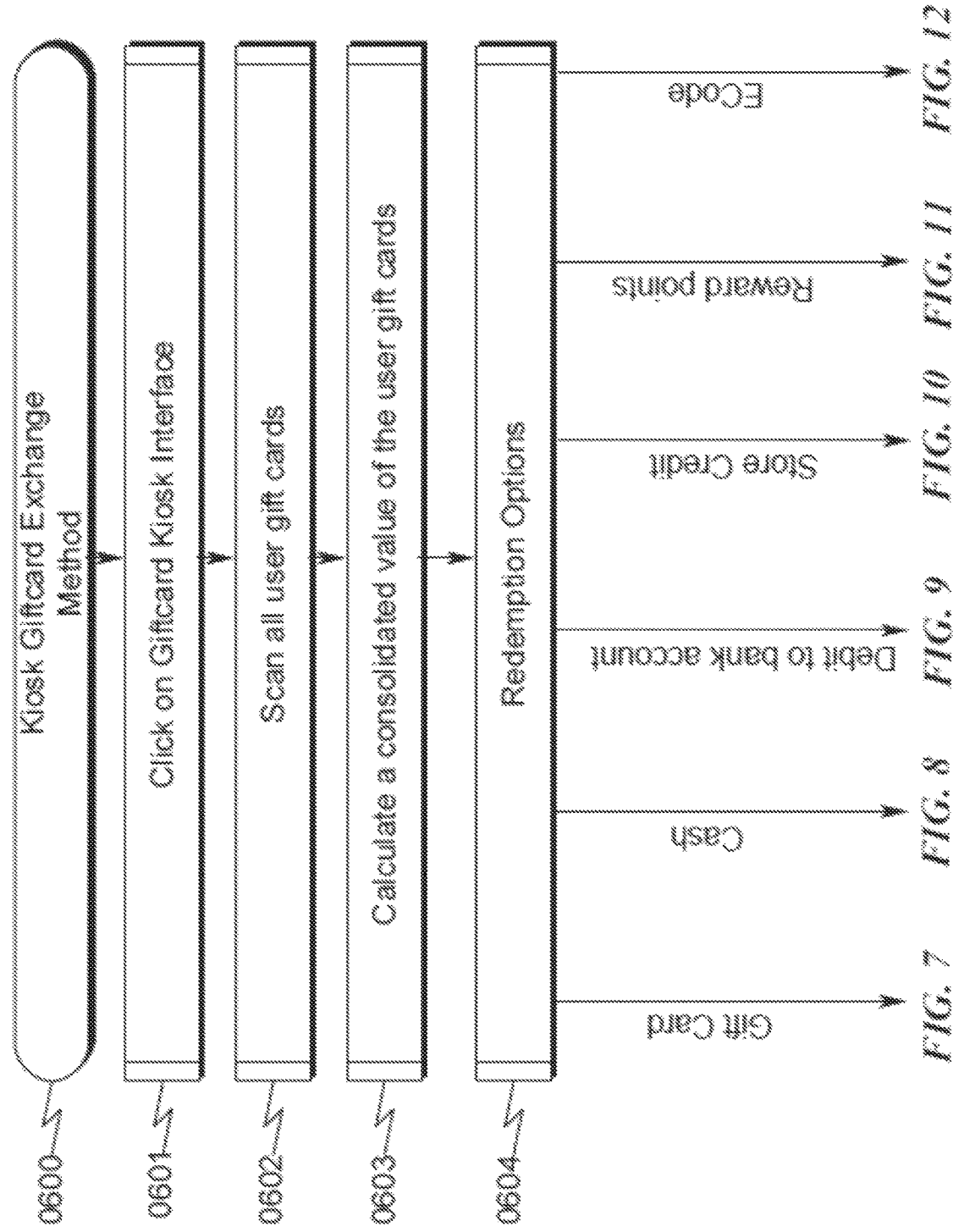
FIG. 6 illustrates a flowchart describing an exemplary kiosk gift card exchange/redeeming according to a preferred embodiment of the present invention.

As generally seen in the flow chart of FIG. 6 (0600), a preferred exemplary Kiosk Gift Card Exchange method may be generally described in terms of the following steps:

(1) clicking on the kiosk processor interface (0601);

A user may click through or touch the KPI to navigate the different options of the interface as aforementioned in FIG. 3 (0300) and FIG. 4 (0400).

(2) scanning user gift cards with a card reader (0602);

The user may insert or use a card reader to scan user gift cards that are unused or have a balance remaining on them. A unique identification number (UID) associated with each gift card may be saved in a local database maintained by the GMS. The Kiosk card collector may collect the cards and unused cards may be recycled or reused for future customized gift cards.

(3) calculating a consolidated value for remaining balance of the user gift cards (0603); and the gift card management server may add the remaining balances on all the user gift cards and determine a consolidated value. The GMS may communicate with plural vendors via the vendor management server with the UID's to determine remaining balance on each cards. For example, gift card 1 may have an unused value of $34, gift card 1 may have an unused value of $46 and gift card 1 may have an unused value of $100. The GMS will determine a consolidated value of $180 for the unused gift cards.

(4) providing redeeming options for exchanging said user gift cards to the users (0604).

The KPI may provide various exchange options for the consolidated value such as another gift card from a different vendor, cash, bank debit, store credit, and/or an eCode for use with online purchases.

Preferred Exemplary Flowchart Kiosk Gift Card-Gift Card Exchange Method (0700)

Figure 7:
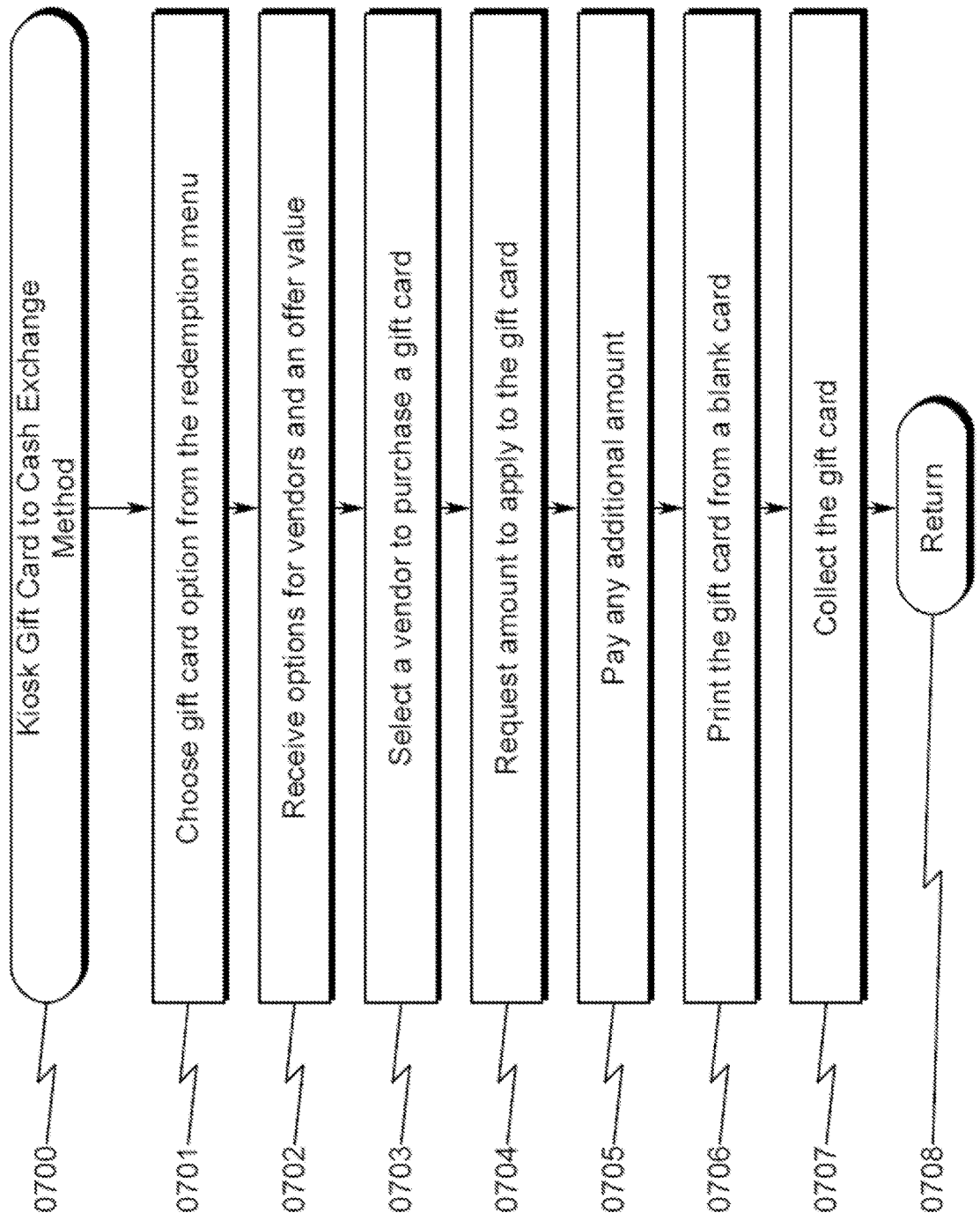
FIG. 7 illustrates a flowchart describing an exemplary kiosk gift card to gift card exchange option according to a preferred embodiment of the present invention.

As generally seen in the flow chart of FIG. 7 (0700), a preferred exemplary Kiosk Gift Card to Gift Card Exchange method may be generally described in terms of the following steps:

(1) choosing gift card option from a redeeming menu on the kiosk processor interface (0701);

(2) receiving plural vendor options and a discounted offer in exchange for the consolidated value (0702);

The GMS may provide the user with a list of available vendors to choose from along with a discounted offer value in exchange for the consolidated value. For example, the GMS may offer a $100 worth Home Depot Card for a consolidated value of $180.

(3) selecting a vendor from said options for a new vendor gift card (0703);

If the user accepts the offer value, the user may select a vendor from the list of vendors.

(4) requesting a monetary amount to apply to the vendor gift card (0704);

The user may request a monetary value to apply to the selected vendor gift card. For example, the user may request to apply $110 to the gift card.

(5) paying any additional monetary amount above the offer value (0705);

The user may pay the $10 difference from the step above to apply to the gift card.

(6) printing and dispensing said gift card from a blank card applying the monetary amount (0706), or, optionally, reloading a previously purchased gift card with the accepted value; and (7) collecting the gift card (0707).

Preferred Exemplary Flowchart Kiosk Gift Card-Cash Exchange Method (0800)

Figure 8:
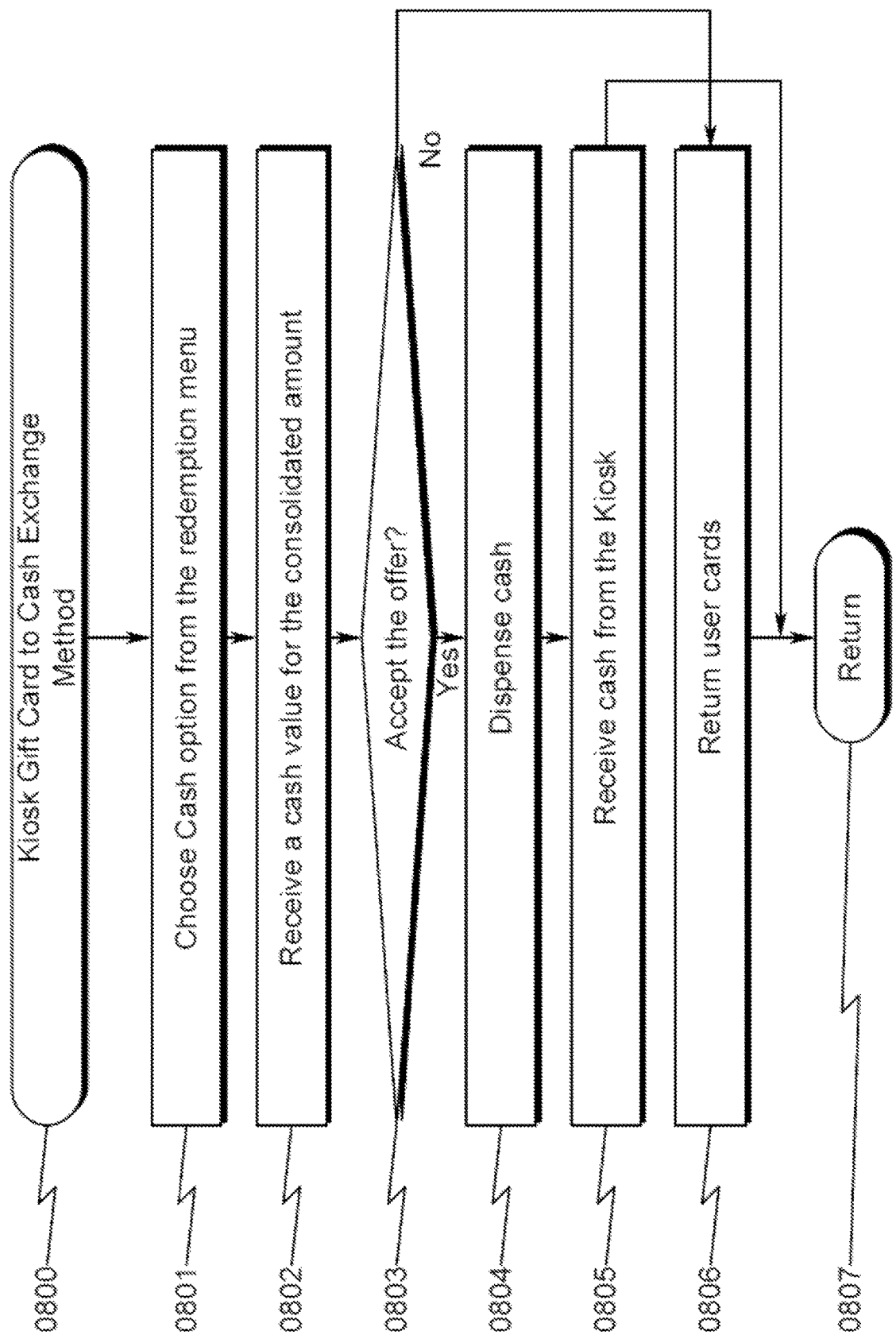
FIG. 8 illustrates a flowchart describing an exemplary kiosk gift card to cash exchange method option according to a preferred embodiment of the present invention.

As generally seen in the flow chart of FIG. 8 (0800), a preferred exemplary Kiosk Gift Card to Cash Exchange method may be generally described in terms of the following steps:

(1) choosing cash option from a redeeming menu on the kiosk processor interface (0801);

(2) receiving a discounted offer in exchange for the consolidated value (0802);

(3) accepting the offer value, if not, proceeding to step (0806) (0803);

(4) dispensing cash for the offer value (0804);

(5) collecting cash from the dispenser (0805); and (6) returning the user gift cards (0806).

Preferred Exemplary Flowchart Kiosk Gift Card-Bank Debit Exchange Method (0900)

Figure 9:
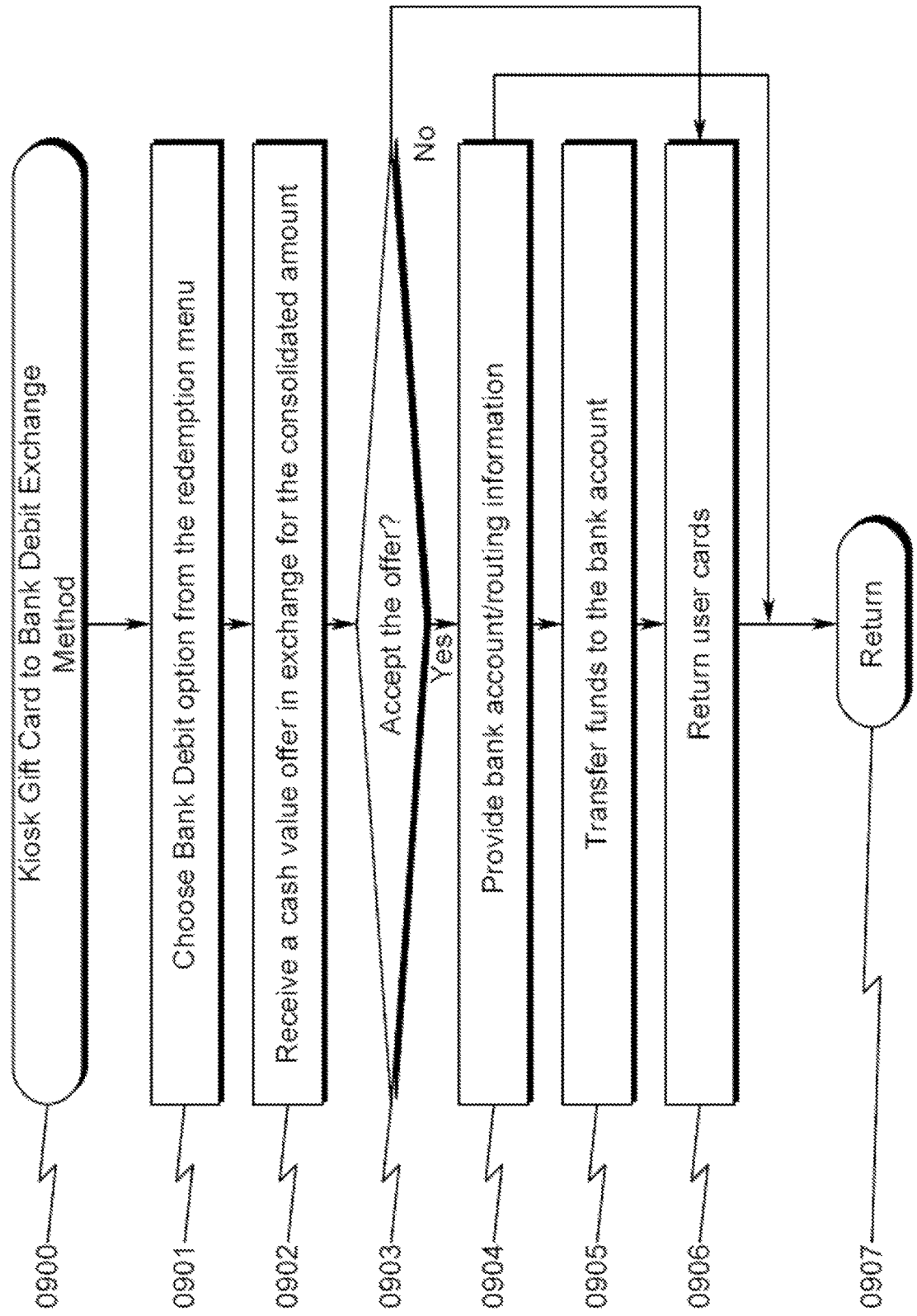
FIG. 9 illustrates a flowchart describing an exemplary kiosk gift card to bank debit exchange method option according to a preferred embodiment of the present invention.

As generally seen in the flow chart of FIG. 9 (0900), a preferred exemplary Kiosk Gift Card to Bank Debit Exchange method may be generally described in terms of the following steps:

(1) choosing bank debit option from a redeeming menu on the kiosk processor interface (0901);

(2) receiving a discounted offer for the consolidated value (0902);

(3) accepting the offer value, if not, proceeding to step (0906) (0903);

(4) providing bank account information (0904);

(5) transferring funds for the offer value to the bank information (0905); and
(6) returning the user gift cards (0906).

Preferred Exemplary Flowchart Kiosk Gift Card-Store Credit Exchange Method (1000)

Figure 10:
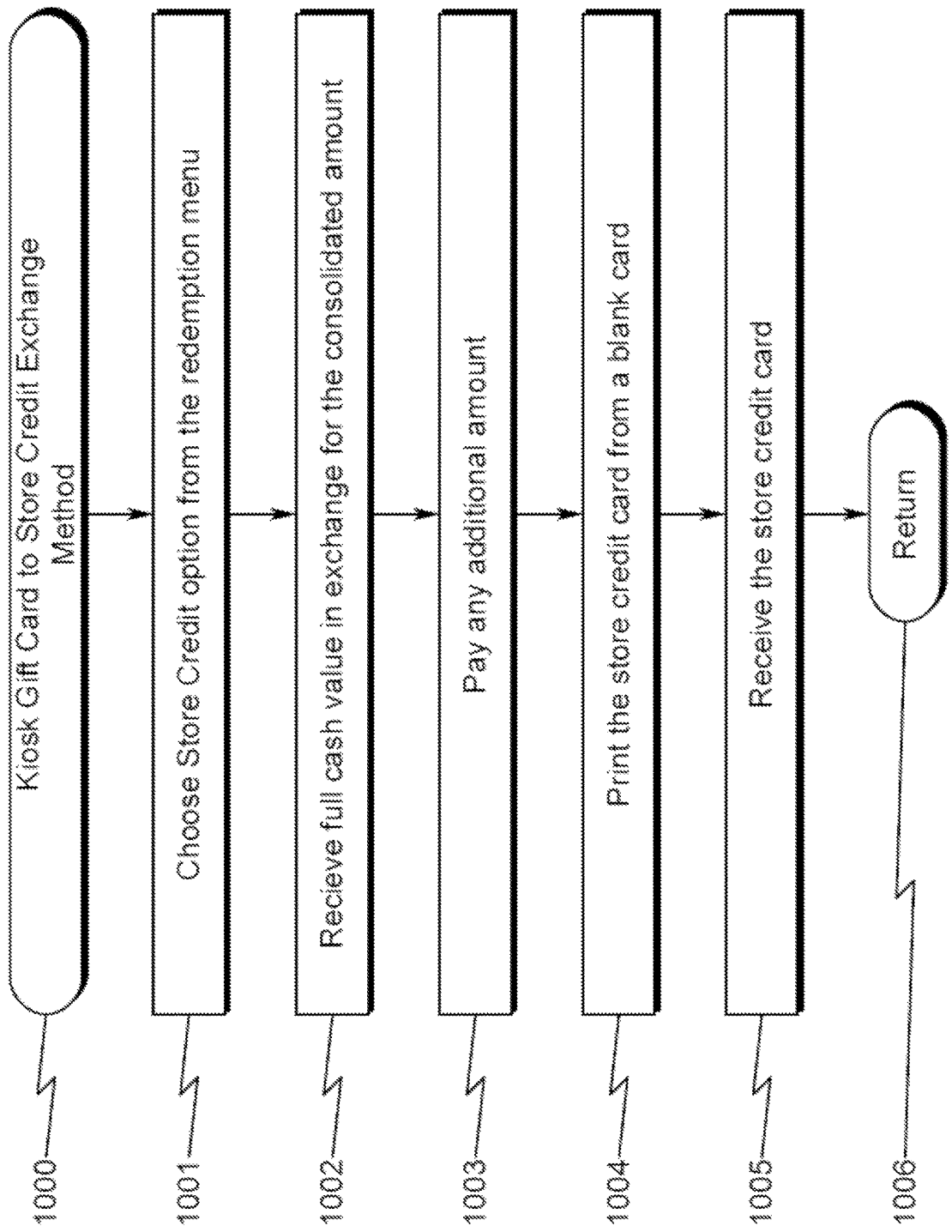
FIG. 10 illustrates a flowchart describing an exemplary kiosk gift card to store credit exchange method option according to a preferred embodiment of the present invention.

As generally seen in the flow chart of FIG. 10 (1000), a preferred exemplary Kiosk Gift Card to Store Credit Exchange method may be generally described in terms of the following steps:
(1) choosing store credit option from a redeeming menu on the kiosk processor interface (1001);
(2) receiving a full value offer in exchange for the consolidated value (1002);
(3) paying any additional monetary amount above the offer value (1003);
(4) printing and dispensing said store card for the retail establishment from a blank card applying the monetary amount (1004); and
(5) collecting the store card (1005).

Preferred Exemplary Flowchart Kiosk Gift Card-Rewards Points Exchange Method (1100)

Figure 11:
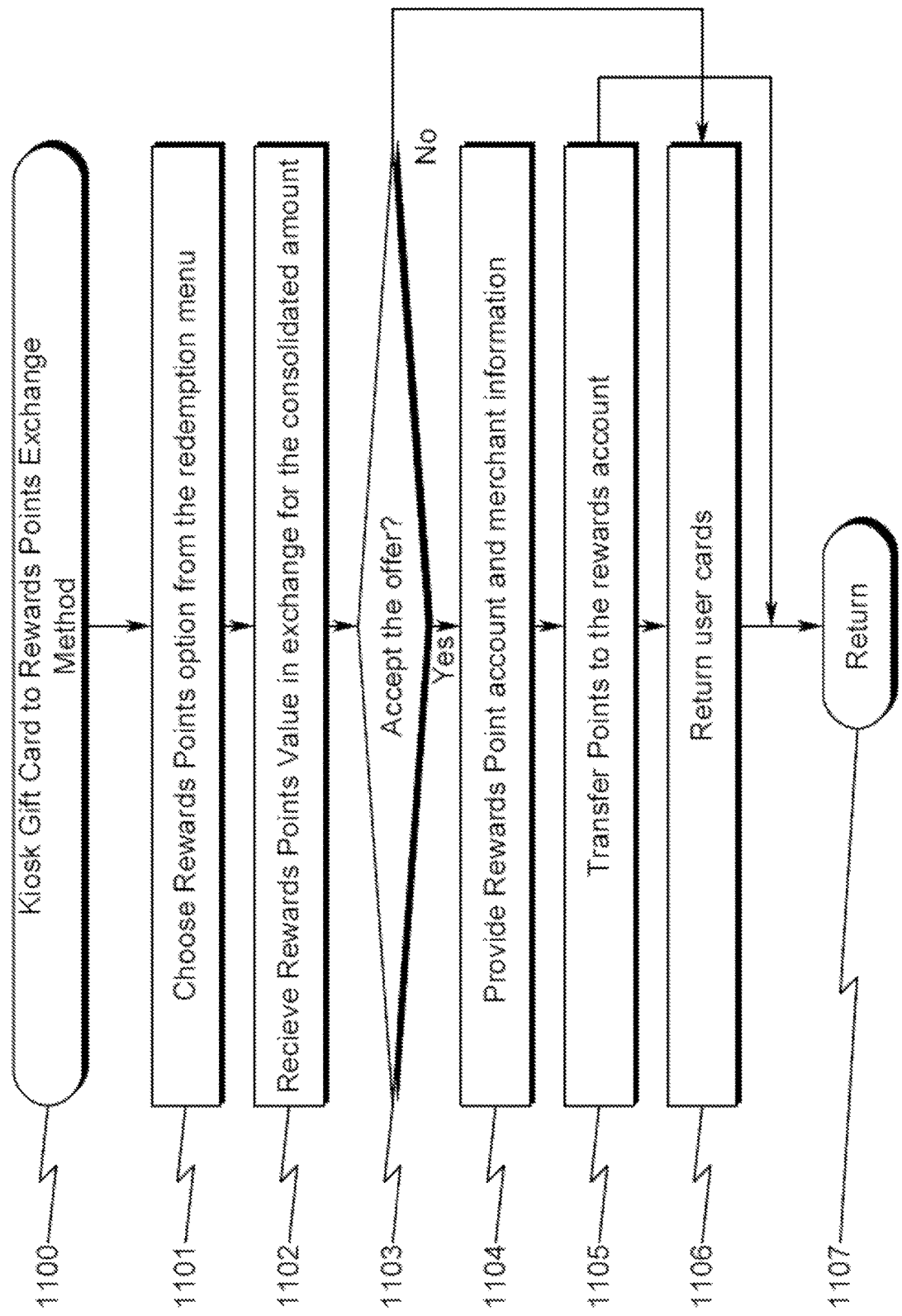
FIG. 11 illustrates a flowchart describing an exemplary kiosk gift card to rewards points exchange method option according to a preferred embodiment of the present invention.

As generally seen in the flow chart of FIG. 11 (1100), a preferred exemplary Kiosk Gift Card to rewards points Exchange method may be generally described in terms of the following steps:
(1) choosing rewards points option from a redeeming menu on the kiosk processor interface (1101);
(2) receiving rewards points in exchange for the consolidated value (1102);
(3) accepting the rewards points, if not, proceeding to step (1106) (1103);
(4) providing rewards account information (1104);
(5) transferring the rewards points to the rewards account (1105); and
(6) returning the user gift cards (1106).

Preferred Exemplary Flowchart Kiosk Gift Card-eCode Exchange Method (1200)

Figure 12:
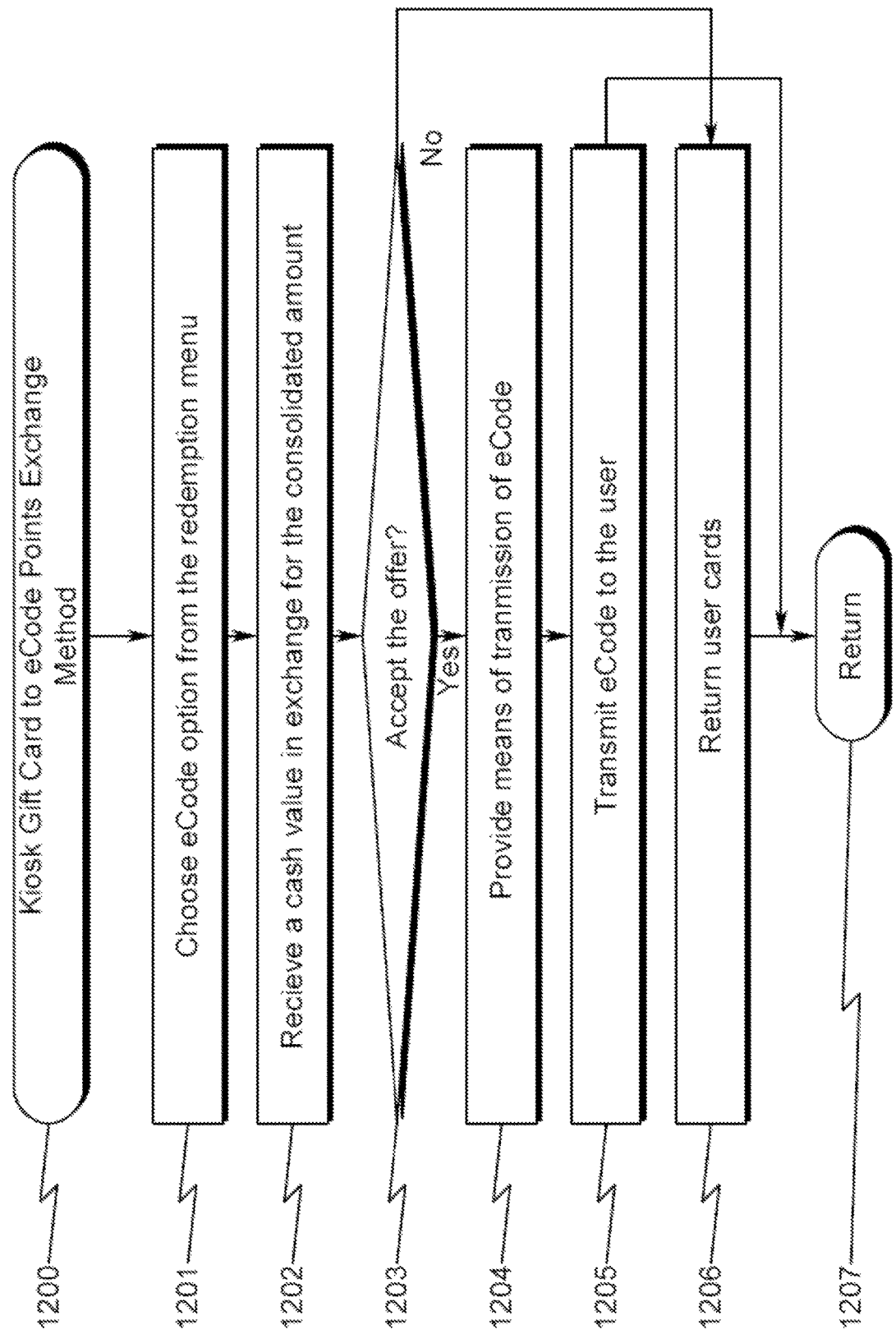
FIG. 12 illustrates a flowchart describing an exemplary kiosk gift card to eCode exchange method option according to a preferred embodiment of the present invention.

As generally seen in the flow chart of FIG. 12 (1200), a preferred exemplary Kiosk Gift Card to rewards points Exchange method may be generally described in terms of the following steps:
(1) choosing eCode option from a redeeming menu on the kiosk processor interface (1201);
(2) receiving a discounted offer in exchange for the consolidated value (1202);
(3) accepting the offer value, if not, proceeding to step (1206) (1203);
(4) providing means for transmitting an eCode to the user (1204);
(5) transmitting the eCode to the user (1205); and
(6) returning the user gift cards (1206).

Preferred Exemplary Gift Card Value Check System (1300)

Figure 13:
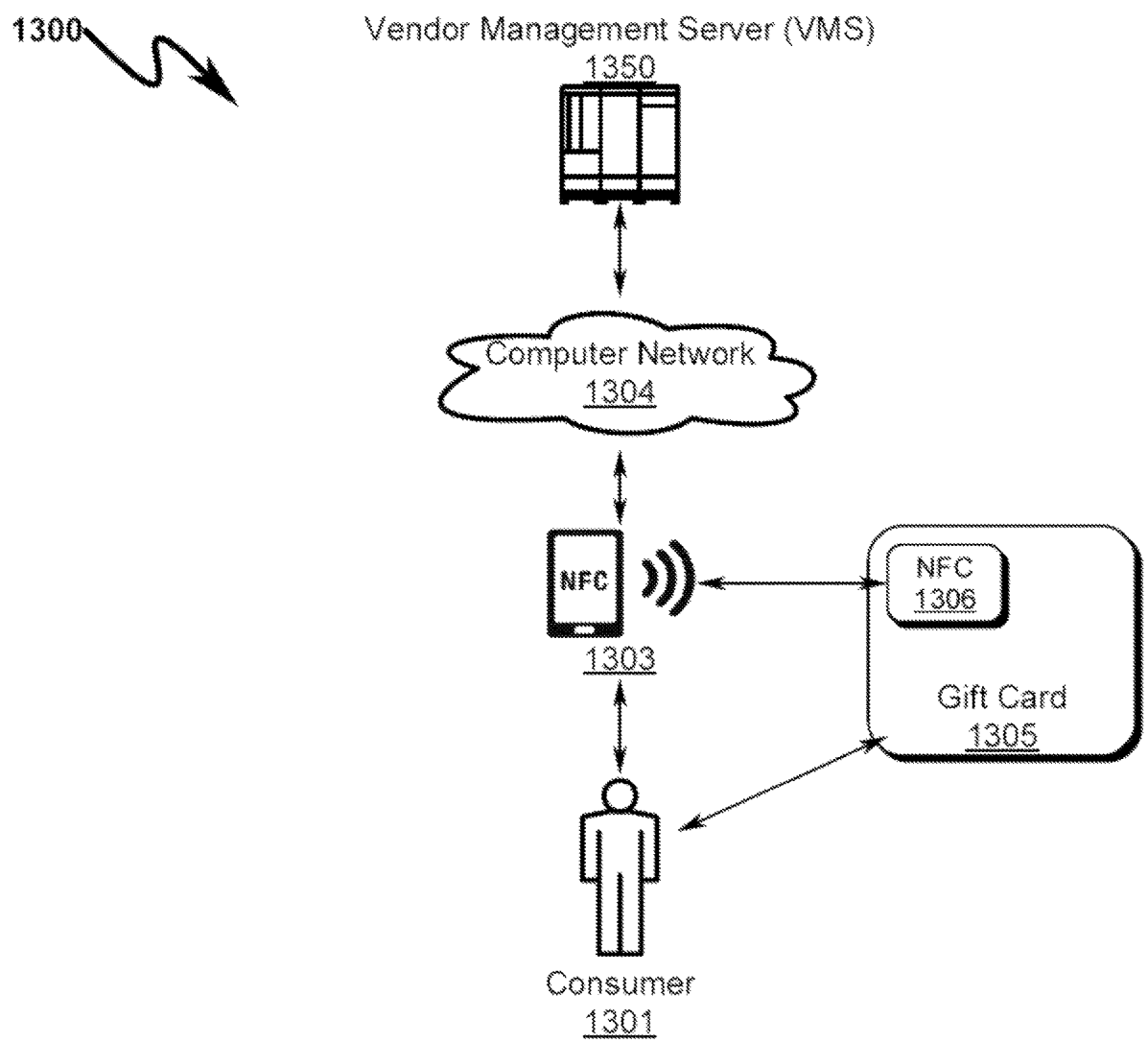
FIG. 13 illustrates a gift card value check system according to a preferred embodiment of the present invention.

The present invention may be seen in more detail as generally illustrated in FIG. 13 (1300), wherein a user/consumer (1301) with a NFC reader equipped mobile computing device (1303) checks value of a gift card (1305). The gift card (1305) may also be embedded with a NFC compatible chip (1306) that communicates wirelessly with device (1303). The consumer (1301) may query the balance of a gift card (1305) with an application on the device (1303). The mobile device (1303) may then query a vendor management server (VMS) (1350) via a network (1304). The VMS (1350) may be remotely located that may be accessible via the network (1304). An administrator may remotely monitor VMS (1350) via the network (1304). The network may be wired and may use protocols such as Ethernet. The network may be wireless and may use protocols such as 4G, LTE, and/or Bluetooth. When queried by the device (1303) with a gift card identification number (Gift card ID), the VMS (1350) may respond with a balance on the gift card. The mobile device (1303) may then display the gift card balance to the consumer (1301).

Preferred Exemplary Gift Card Value Check Method (1400)

Figure 14:
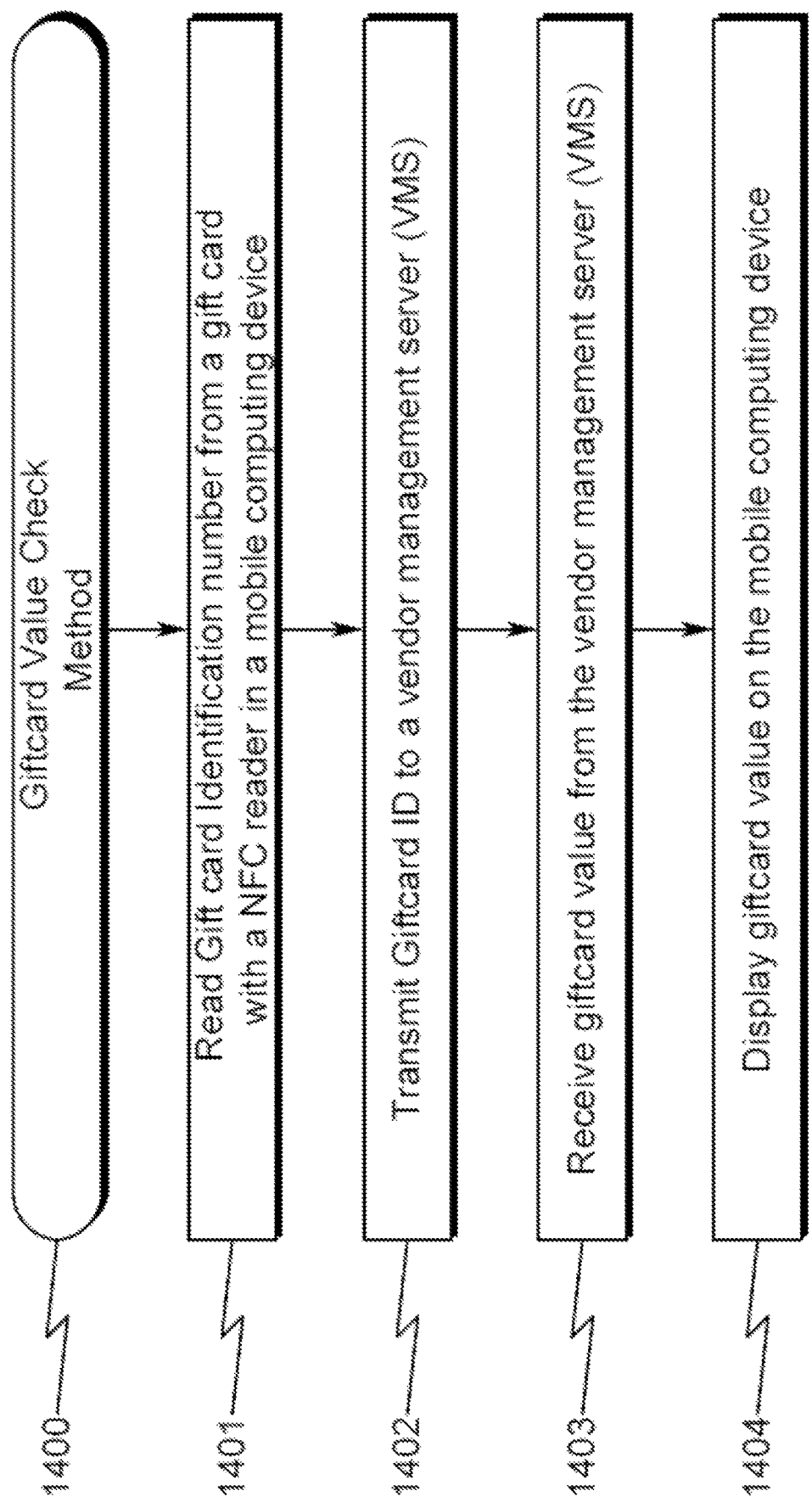
FIG. 14 illustrates a flowchart describing a gift card value check method according to a preferred embodiment of the present invention.

As generally illustrated in FIG. 14 (1400), the present invention system may be utilized in the context of an overall gift card balance/value check method, wherein the gift card value check system as described previously in FIG. 13 (1300) is controlled by a method having the following steps:
(1) reading gift card identification (ID) number from a gift card with a NFC reader in a mobile computing device (1401);
(2) transmitting the gift card ID to a vendor management server (1402);
(3) receiving gift card balance from the vendor management server (1403); and
(4) displaying the gift card balance on the mobile computing device (1404).

Preferred Exemplary Remote Kiosk Gift Card Presentation System (1500)

Figure 15:
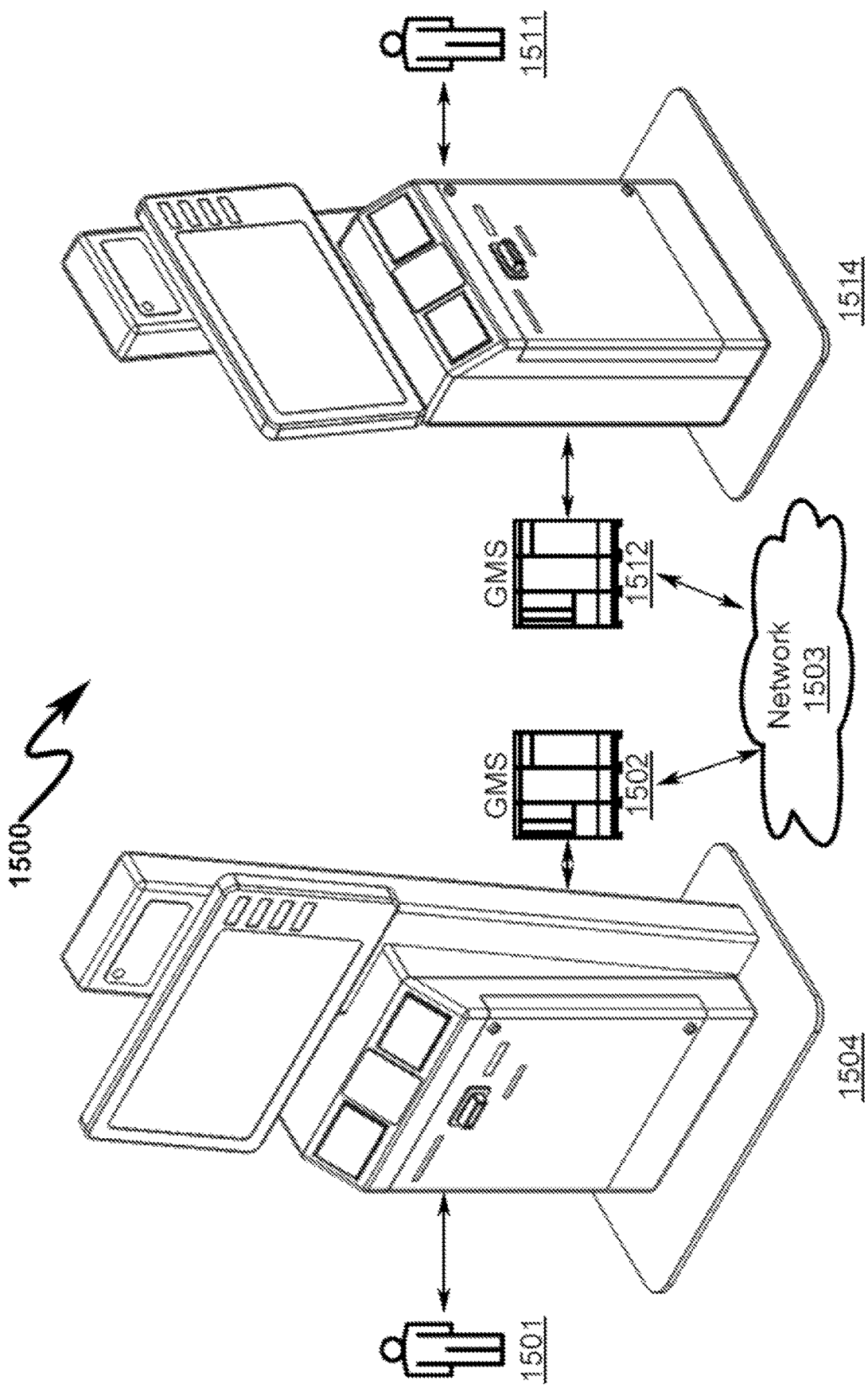
FIG. 15 illustrates an exemplary remote kiosk gift card presentation system according to a preferred embodiment of the present invention.

The present invention may be seen in more detail as generally illustrated in FIG. 15 (1500), wherein a kiosk gift card system comprises a kiosk (1504) with a gift card dispenser, a live interface portal (LIP), and a kiosk processor interface that communicates with a gift card management server (1502). The kiosk processor interface may be a touch user interface that is based upon the sense of touch or a graphical user interface (GUI) that may be navigated with a pointing device such as a mouse. A user (1501) may use the touch interface to interact and navigate the kiosk (1504). The kiosk (1504) may communicate with another remote kiosk (1514) located at a different retail establishment. The retail establishment may be located in the same place or in a different location or place. According to a preferred exemplary embodiment, a user may purchase a gift card at a kiosk with the kiosk processor interface and print the gift card at a remote kiosk that could be collected at the remote retail establishment. Similarly, the user may purchase funds for a gift card at the first location, and then those purchased funds may be loaded onto a previously purchased gift card at the second location. The kiosk (1504) may communicate with kiosk (1514) via a network (1503) through gift card management system (1502) and gift card management system (1512). According to yet another preferred exemplary embodiment, a user may redeem unused gift cards at a kiosk with the kiosk processor interface, accept an offered monetary value from the kiosk, and print the gift card at a remote kiosk that could be collected at the remote retail establishment. According to a further preferred exemplary embodiment, a user (1501) may purchase a gift card at a kiosk (1504) with the kiosk processor interface, receive an electronic code (eCode) from the kiosk (1504), and transmit the eCode to another user (1511) located at another location. The user (1511) may then print a customized gift card at a remote kiosk (1514). The eCode may be scrambled, encrypted, and/or encoded for security purposes.

Preferred Exemplary Flowchart Remote Kiosk Gift Card Presentation Method (1600)

As generally illustrated in FIG. 16 (1600), the present invention system may be utilized in the context of an overall remote kiosk gift card presentation method, wherein the remote kiosk gift card presentation system as described previously in FIG. 15 (1500) is controlled by a method having the following steps:
(1) paying cash or redeeming unused gift cards (gift cards with a balance) choosing eCode option from a redemption menu on a kiosk processor interface (1601);
(2) receiving a discounted cash offer value in exchange for the consolidated value of the unused gift cards (1602);
(3) accepting the offer value and selecting a eCode or eCode option, if not, proceeding to step (1609) (1603);
(4) providing means for transmitting a eCode to the user, if eCode is selected (1604);
(5) transmitting the eCode to a remote user (1605);
(6) purchasing gift cards with said eCode at a second gift card kiosk located in a second location (1606);
(7) printing a gift card at a remote kiosk in a different (second) location in a retail establishment, if remote printing is selected in step (1603) (1607);
(8) collecting the printed gift card at the remote kiosk by a second user (1608);
(9) returning the user gift cards (1609).

Anywhere Use Gift Cards

Another embodiment of the disclosed systems and methods may be the creating or reloading of a gift card that may be used at any of a number of retailers. Such "anywhere" gift cards may be created for use anywhere the user desires, making them gift "wildcards" so to speak. For example, such gift "wildcards" may be based on the VISA® or MasterCard® network, and thus useable anywhere VISA or MasterCard is accepted. In other embodiments, the gift "wildcard" may be created for use at multiple distinct vendors, rather than simply a single vendor. However, such anywhere use gift card created in accordance with the disclosed principles could not only be customized and/or personalized as discussed herein, but also paid for at one kiosk location but printed/created (or reloaded in the case of a previously purchased gift card) at a second location. Such embodiments provide much more versatility in the receiver's use of the gift card, making them especially beneficial when the gift card is received by a user geographically distinct from the purchaser, such as a student away at school. Moreover, such a anywhere-use "gift wildcard" is advantageous since it may be used at any of a number of merchants/retailers, and may be obtained from a kiosk as disclosed herein in exchange for a consolidation/exchange of previously purchased merchant-specific gift or store credit cards.

Restricted Use Gift Cards

Another embodiment of the disclosed systems and methods may be the creating or reloading of a restricted or limited use gift card. Such restricted or limited use gift cards could be similar to the anywhere use gift cards discussed above in that they may be used at any of a number of vendors; however, that may be created with limits that prevent their use at certain vendors or for certain types of products or services. For example, a gift card could be created for use at any vendor except for liquor stores, adult-themed stores, tobacco shops, drug dispensaries or other types of vendors of goods or services where the purchaser of the limited use gift card does not want the receiver to use the card. Such an embodiment is particularly suited for families, where parents provide such a limited use gift card to their children, but having limits on where they may be used. Similarly, the limited use gift card may be created such that it may only be used at certain type of vendors, such as bookstores, gas stations, and office supply stores. Such limited use gift cards would be desirable if the receiver is a student and the purchaser would like to limit the student's use of the gift card to school-related purchases.

In still other embodiments, the gift card could be limited so that it excludes the purchase of certain types of products. Most if not all products today are packaged with a skew or other type of identifying number, which assists retailers in tracking inventory as well as other uses. Limited use gift cards as disclosed herein could be created such that may be used at any retailer, but could not be used to purchase certain items. For example, the gift card could be created such that the receiver of such a limited use gift card could purchase almost any item at a grocery store, except for alcohol and/or tobacco products. In other embodiments, the purchase amounts may be limited such that only purchases below a certain maximum amount may be made with the gift card in an effort to curtail overspending. Such limitations on the retailers, spending limits, and/or products that may be purchased with the limited use gift card allows the disclosed gift card to be ideal for use as a "family gift card," where parents can provide their children any amount of funds via the gift card for use at a variety of retailers, but still place limits on its use at certain retailers and/or for purchasing certain goods or services, and only up a maximum amount per transaction. Such embodiments are a more desirable alternative to simply providing their children cash or even a credit card for their exclusive use in that protection against certain types of spending are still in place.

Limiting the use of a gift card as disclosed herein at particular merchants, or preventing use at particular merchants, may be done by interacting with the data collected and transmitted by the payment terminal at a merchant when purchases using cards or other payment vehicles are made. Conventionally, the payment terminals capture payment information from the purchaser from the card or other payment vehicle used with the payment terminal. That information, along with merchant identification information, is then transmitted to a payment processor from the terminal via a communications network. The merchant identification information could be used to identify at what merchant the disclosed gift card is being used, and then permit or prevent the payment processing to be completed. Similarly, payment terminals may be configured to capture skew or other product identifying data, along with the purchasing information, during a financial transaction. That product identification data may be used to allow or prevent certain goods from being purchased with the disclosed gift card right at the payment terminal and in real-time with the transaction by the user of the gift card. Other types of technologies may also be implemented with the disclosed limited use gift card to accomplish the same goals.

Even gift cards with geographical limits could be created using kiosk according to the disclosed principles. For example, a limited use gift card could be coded so that it may only be used at a retailer within a certain Zip code or other geographical boundary. In some embodiments, the gift card could be created with NFC technology, such as an embedded NFC chip, so that it may only be used when in proximity to the user's mobile telephone. The locations services on the phone could then be employed to ensure the limited use gift card is only being used with a particular geographic location, which can even include limitation to a particular retailer, etc. based on their geographic location. In other embodiments, the merchant identification information provided by the payment terminal discussed above may be used to identify not only the merchant, but the merchant's location, especially in embodiments where a particular merchant has numerous locations. As before, the intercepting of that information from the payment terminal allows for placing real-time geographic restrictions on the purchases made using a limited use gift card as disclosed herein.

Still further, the limitations and restrictions that may be placed on a limited use gift card as disclosed herein may also be changeable by the purchaser or the user, perhaps with a predetermined access code, via a kiosk, if desired. The receiver of the limited use gift card, if given the capability, could simply visit their local kiosk with the gift card in order to modify the limitations place on their family gift card by the purchaser. Moreover, such access and modifications may be made via website associated with the vendor of the gift card, if such capabilities have been established.

Limited Edition Gift Cards

Another embodiment of the disclosed systems and methods may be the creating or reloading of "limited edition" or "collector edition" gift cards. Such embodiments may provide for the creation of a limited number or run of such collector/limited edition gift cards. In this context, a limited run of gift cards would be only a predetermined number of gift cards being created with a given image and/or text. Thus, the purchaser would be purchasing, for example, 1 of only 500 cards available with such a certain theme. Exemplary limited edition gift cards could include gift cards having images of or otherwise related to movies, TV shows, and musical bands. Similarly, the limited edition gift cards could include images or other items related to specific persons/celebrities or items related to specific movies, TV shows or musical acts. Of course, other types of limited edition gift cards are also envisioned, and no limitation to just TV, movies or bands is intended.

Greeting Cards

Another embodiment of the disclosed systems and methods may be the creating of greeting cards being purchased or created at the kiosk by the purchaser. Such greeting cards could be premade greeting cards and selected via the kiosk, or may be customized by the purchaser using the kiosk as disclosed herein. Such greeting cards may be selected/designed alone by the purchaser via the kiosk and sent to a receiver via a second (or the same) kiosk, or may be transmitted to the receiver using any type of technique, such as email, messaging, and even the printing and mailing of a physical card (for example, using an affiliate associated with the kiosk) if that option is selected by the purchaser via the kiosk. Additionally, such optional greeting cards may be purchased and provided to a receiver along with a gift card that is purchased and provided as disclosed herein.

Ticketing

Another embodiment of the disclosed systems and methods may be the purchasing of tickets for certain events via the kiosk. Such tickets may be for the purchaser employing the kiosk, or may be provided to an intended receiver as disclosed herein. As such, purchased tickets may be provided via a gift card, or may be provided via a traditional printed ticket. Tickets may also be provided by eCode or "eTicket", where the ticket is provided digitally. These may be provided in any of a number of ways, such as an emailed eCode or other type of code (e.g., barcode, QR code, etc.), a messaged code, or even NFC transfer to a mobile device (or either the purchaser or the receiver of the ticket). Tickets purchased via a disclosed kiosk may include encoded tickets for events such concerts, plays, and sporting events.

Streaming Cards

Another embodiment of the disclosed systems and methods may be the purchasing gifts in the form of gift cards or eCodes (or any other type of code) for downloading or streaming movies, shows, video games, or music. In exemplary embodiments, movies and video games may be selected by title, while music may be selected by musical artist/group name, album name or even track names. Such streaming cards or codes may be selected by the purchaser via the kiosk and sent to a receiver via a second (or the same) kiosk, or as before may be transmitted to the receiver using any type of technique, such as email, messaging, and even the printing and mailing of a physical card. Physical gift cards could include a code (e.g., bar code, QR code, etc.) for direct streaming of media content to the receiver's mobile phone or other device, computer, tablet, media streaming box, DVR, etc. Moreover, for physical streaming cards may also be purchased as a limited edition cards, as discussed above, where the purchased item(s) may correspond to the imagery on the limited edition card.

System Summary

The present invention system anticipates a wide variety of variations in the basic theme of kiosk gift card system, but can be generalized as a kiosk gift card system in a retail establishment comprising:
   (a) kiosk processor interface;
   (b) gift card management server;
   (c) card reader; and
   (d) gift card dispenser;
   wherein
   the kiosk processor interface is configured to enable users to interact with the gift card management server;
   the gift card management server is configured to connect to a network;
   the gift card management server is configured to provide the users with options to purchase user-selected gift cards; and
   the gift card dispenser is configured to print the user-selected gift cards upon receiving payment through the card reader.

This general system summary may be augmented by the various elements described herein to produce a wide variety of invention embodiments consistent with this overall design description.

Method Summary

The present invention method anticipates a wide variety of variations in the basic theme of implementation, but can be generalized as a kiosk gift card system purchase method wherein the method is performed on a kiosk gift card system comprising:

(a) kiosk processor interface;
(b) gift card management server;
(c) card reader; and
(d) gift card dispenser;
wherein
the kiosk processor interface is configured to enable users to interact with the gift card management server;
the gift card management server is configured to connect to a network;
the gift card management server is configured to provide the users with options to purchase user-selected gift cards or to add funds to used gift cards; and
the gift card dispenser is configured to print the user-selected gift cards, or returning a reloaded gift card, upon receiving payment through the card reader;
wherein the method comprises the steps of:
(1) clicking on the kiosk processor interface;
(2) browsing through a list of vendors;
(3) selecting a vendor to purchase a gift card or gift card funds from the vendor;
(4) requesting a monetary amount to apply to the gift card;
(5) paying the monetary amount;
(6) printing and/or dispensing the gift card; and
(7) collecting the gift card.

This general method summary may be augmented by the various elements described herein to produce a wide variety of invention embodiments consistent with this overall design description.

System/Method Variations

The present invention anticipates a wide variety of variations in the basic theme of kiosk gift card system. The examples presented previously do not represent the entire scope of possible usages. They are meant to cite a few of the almost limitless possibilities.

This basic system and method may be augmented with a variety of ancillary embodiments, including but not limited to:

An embodiment wherein the gift card management server is further configured to communicate via the network with:
(a) vendor management server;
(b) payment server;
(c) vendor database; and
(d) advertising server
wherein
the vendor management server is configured to communicate with plural vendors to submit user requests for gift cards;
the plural vendors are configured to respond to the user requests with the network;
the vendor database is configured to store and maintain data related to the plural vendors;
the payment server is configured to accept payments for the gift cards; and
the advertising server is configured to display advertisements on the kiosk processor interface.
An embodiment wherein the kiosk processor interface is a touch interface.
An embodiment wherein the kiosk processor interface is a graphical interface.
An embodiment wherein the network is wired.
An embodiment wherein the network is wireless.

One skilled in the art will recognize that other embodiments are possible based on combinations of elements taught within the above invention description.

CONCLUSION

A kiosk gift card system and method for purchasing gift cards at a kiosk has been disclosed. The system/method includes a gift card distribution kiosk located at a retail establishment that provides a user with access to a multitude of different forms of gift cards that may be purchased and printed onto a customizable card with a personalized message. The kiosk includes a kiosk processor interface, a gift card dispenser, a card reader and gift card management server connected to a network. The gift card management server, through the kiosk processor interface, provides vendor options to users to select and pay via the card reader. In another embodiment, the kiosk is used to redeem unused user gift cards for a reduced value user selected gift card, reduced cash value, full value store card, rewards points, bank debit, and/or electronic code user towards online purchases.

The invention claimed is:

1. A kiosk gift card system in a retail establishment for funding on-demand gift cards, said system comprising:
(a) gift card management server (GMS);
(b) kiosk processor interface (KPI);
(c) kiosk card reader (KCR);
(d) gift card dispenser (GCD);
(e) gift card collector (GCC);
(f) gift card printer (GCP); and
(g) gift card stacker (GCS);
wherein
said KPI is configured to electronically communicate with said GMS through a computer communications network (CCN);
said KPI is configured to enable users to interact with said GMS through said CCN;
said GMS is configured to provide said users with options to purchase user-selected gift cards;
said GMS is configured to provide said users with options to redeem value within or consolidate monetary value from within one or more pre-existing gift cards;
said GCP is configured to print said user-selected gift cards upon receiving a payment from said user;
said user-selected gift cards are associated with a gift card value;
said GCS is configured to provide blank cards for said user-selected gift card printing to said GCP;
said KPI is configured to permit said user-selected gift card printing to be customized by said user to include information pertaining to: gift card size, gift card personalized message, and gift card value;
said KPI is configured to permit said user-selected gift card to be customized by said user to include purchasing limitations on said user-selected gift card; and
said GCD is configured to dispense said user-selected gift cards to said user after printing by said GCP.

2. The kiosk gift card system of claim 1, wherein said GMS is further configured to communicate to said KPI via said CCN using:
(a) a vendor management system (VMS);
(b) a payment server; and
(c) a vendor database;
wherein
said VMS is configured to communicate with a plurality of vendors to submit user requests for gift cards;

said plurality of vendors are configured to respond to said user requests via said CCN;

said vendor database is configured to store and maintain data related to said plurality of vendors; and said payment server is configured to accept payments for said gift cards.

3. The kiosk gift card system of claim 2, wherein the user-selected gift card is merchant-agnostic and thereby useable at a plurality of different merchants.

4. The kiosk gift card system of claim 3, wherein at least one of the plurality of vendors comprises a processor of payments between merchants and financial institutions, wherein dispensed gift cards associated with said at least one vendor are useable at a plurality of different merchants.

5. The kiosk gift card system of claim 2, wherein the kiosk gift card system is located in a retail establishment of one of the plurality of vendors, and wherein dispensed gift cards associated with said one of the plurality of vendors are provided with more gift card value than dispensed gift cards associated with other vendors for the same amount of user payment.

6. The kiosk gift card system of claim 2, wherein said GMS is further configured to communicate to said KPI via said CCN using an advertising server, wherein said advertising server is configured to display advertisements on said KPI.

7. The kiosk gift card system of claim 1, wherein said purchasing limitations comprise restrictions against purchasing particular items with said user-selected gift card.

8. The kiosk gift card system of claim 1, wherein said purchasing limitations comprise restrictions against purchasing at particular merchants with said user-selected gift card.

9. The kiosk gift card system of claim 1, wherein said purchasing limitations comprise restrictions on geographic limits for purchasing with said user-selected gift card.

10. The kiosk gift card system of claim 1, wherein said gift card value is associated with a discounted value of said one or more pre-existing gift cards.

11. The kiosk gift card system of claim 1, further comprising a means to dispense cash associated with a discounted value of said one or more pre-existing gift cards.

12. The kiosk gift card system of claim 1, wherein said KPI is configured to redeem one or more of said one or more pre-existing gift cards and consolidate the monetary value of said one or more pre-existing gift cards into a discounted value of said consolidated monetary value.

13. The kiosk gift card system of claim 12, wherein said KPI is configured to provide said discounted value of said consolidated monetary value via a single gift card to said user.

14. The kiosk gift card system of claim 1, wherein said KPI is a touch interface.

15. The kiosk gift card system of claim 1, wherein said KPI is a graphical interface.

16. The kiosk gift card system of claim 1, wherein said CCN is provided via a wired connection to the kiosk.

17. The kiosk gift card system of claim 1, wherein said CCN is provided via a wireless connection to the kiosk.

18. The kiosk gift card system of claim 1, wherein said KPI is further configured to permit said user-selected gift card printing to be customized by said user to include information pertaining to:
- gift card size,
- gift card color,
- gift card logo,
- gift card personalized message, and/or
- gift card near field communication (NFC) chip.

19. The kiosk gift card system of claim 1, wherein:
- said kiosk gift card system is a first kiosk gift card system, configured to communicate with a second kiosk gift card system via said CCN; and
- said KPI of said first kiosk gift card system is further configured to communicate with said second kiosk gift card system via said CCN to affect printing of said user-selected gift card on said second kiosk gift card manufacturing system.

20. The kiosk gift card system of claim 1, wherein said received payment from said user comprises said consolidated monetary value of said one or more pre-existing gift cards.

\* \* \* \* \*